US010244278B2

(12) United States Patent
Sullivan et al.

(10) Patent No.: US 10,244,278 B2
(45) Date of Patent: Mar. 26, 2019

(54) METHODS AND APPARATUS TO PERFORM IDENTITY MATCHING ACROSS AUDIENCE MEASUREMENT SYSTEMS

(71) Applicant: The Nielsen Company (US), LLC, New York, NY (US)

(72) Inventors: Jonathan Sullivan, Hurricane, UT (US); Peter Campbell Doe, Ridgewood, NJ (US); Edmond Wong, New York, NY (US)

(73) Assignee: The Nielsen Company (US), LLC, New York, NY (US)

( * ) Notice: Subject to any disclaimer, the term of this patent is extended or adjusted under 35 U.S.C. 154(b) by 24 days.

(21) Appl. No.: 15/385,404

(22) Filed: Dec. 20, 2016

(65) Prior Publication Data
US 2017/0188067 A1   Jun. 29, 2017

Related U.S. Application Data

(60) Provisional application No. 62/387,535, filed on Dec. 28, 2015.

(51) Int. Cl.
*H04N 21/258* (2011.01)
*H04N 21/25* (2011.01)
(Continued)

(52) U.S. Cl.
CPC .......... *H04N 21/252* (2013.01); *H04H 60/31* (2013.01); *H04H 60/45* (2013.01); *H04H 60/46* (2013.01);
(Continued)

(58) Field of Classification Search
CPC .......... H04N 21/252; H04N 21/30327; H04N 21/30522; H04N 21/25883; H04N 21/4667; H04N 21/812; H04H 60/46
See application file for complete search history.

(56) References Cited

U.S. PATENT DOCUMENTS

2012/0278331 A1* 11/2012 Campbell ......... G06F 17/30035
707/740
2013/0145022 A1* 6/2013 Srivastava ......... G06Q 30/0241
709/224

(Continued)

*Primary Examiner* — Fernando Alcon
(74) *Attorney, Agent, or Firm* — Hanley, Flight & Zimmerman, LLC

(57) ABSTRACT

Methods, apparatus, systems and articles of manufacture to perform identity matching across audience measurement systems are disclosed. An example apparatus includes a data normalizer to normalize audience measurement events corresponding to media exposure data obtained from a first audience measurement system and a second audience measurement system, a tree builder to build a k-dimensional tree based on normalized audience measurement events, a candidate identifier to calculate a distance between a query event and a first audience measurement event included in a search space in the k-dimensional tree, identify the query event and the first audience measurement event as a candidate match when the calculated distance satisfies a distance threshold, an array builder to generate metrics at an identifier-level based on a plurality of candidate matches, and a thresholder to identify an identifier mapping linking a first user identifier to a second user identifier when the metrics satisfy respective metric thresholds.

20 Claims, 10 Drawing Sheets

(51) Int. Cl.
- *H04N 21/81* (2011.01)
- *H04N 21/466* (2011.01)
- *H04H 60/31* (2008.01)
- *H04H 60/45* (2008.01)
- *H04H 60/46* (2008.01)

(52) U.S. Cl.
CPC ... *H04N 21/25883* (2013.01); *H04N 21/4667* (2013.01); *H04N 21/812* (2013.01)

(56) References Cited

U.S. PATENT DOCUMENTS

| | | | |
|---|---|---|---|
| 2014/0028850 A1* | 1/2014 | Keating | G06T 19/006 348/158 |
| 2015/0012544 A1* | 1/2015 | Nishimura | G06F 17/30333 707/743 |
| 2017/0064411 A1* | 3/2017 | Goli | H04N 21/812 |

* cited by examiner

| User Identifier | Event Identifier | Start Time | Duration (Minutes) | Station Identifier |
|---|---|---|---|---|
| Subscriber 1 | 1.1 | 07:25:31 AM | 15 | TV1 |
| Subscriber 1 | 1.2 | 12:36:17 PM | 25 | TV2 |
| Subscriber 1 | 1.3 | 03:57:33 PM | 47 | TV3 |
| Subscriber 2 | 2.1 | 07:24:31 AM | 6 | TV3 |
| Subscriber 2 | 2.2 | 12:39:23 PM | 23 | TV4 |
| Panelist A | A.1 | 07:25:31 AM | 5.6386 | TV3 |
| Panelist A | A.2 | 12:36:17 PM | 22.8894 | TV4 |
| Panelist B | B.1 | 07:25:31 AM | 12.0472 | TV1 |
| Panelist B | B.2 | 12:36:17 PM | 33.4051 | TV2 |
| Panelist B | B.3 | 03:57:33 PM | 7.5942 | TV3 |
| Panelist C | C.1 | 07:27:34 AM | 14.5442 | TV1 |
| Panelist C | C.2 | 12:38:25 PM | 25.1713 | TV2 |
| Panelist C | C.3 | 03:59:48 PM | 46.8106 | TV3 |

Raw Audience Measurement Data Data Table

FIG. 3

| | User Identifier | Event Identifier | Start Time | Duration (Minutes) | Station Identifier |
|---|---|---|---|---|---|
| 450 | Subscriber 1 | 1.1 | 222.8 | 50.0 | 1,000,000 |
| 452 | Subscriber 1 | 1.2 | 378.1 | 83.3 | 2,000,000 |
| 454 | Subscriber 1 | 1.3 | 478.8 | 156.7 | 3,000,000 |
| 460 | Subscriber 2 | 2.1 | 222.3 | 20.0 | 3,000,000 |
| 462 | Subscriber 2 | 2.2 | 379.7 | 76.7 | 4,000,000 |
| 470 | Panelist A | A.1 | 222.8 | 18.8 | 3,000,000 |
| 472 | Panelist A | A.2 | 378.1 | 76.3 | 4,000,000 |
| 480 | Panelist B | B.1 | 222.8 | 40.2 | 1,000,000 |
| 482 | Panelist B | B.2 | 378.1 | 111.4 | 2,000,000 |
| 484 | Panelist B | B.3 | 478.8 | 25.3 | 3,000,000 |
| 490 | Panelist C | C.1 | 223.8 | 48.5 | 1,000,000 |
| 492 | Panelist C | C.2 | 379.2 | 83.9 | 2,000,000 |
| 494 | Panelist C | C.3 | 479.9 | 156.0 | 3,000,000 |

Translated Audience Measurement Data Data Table

| Start Time Standard Deviation | Duration Standard Deviation | Station Standard Deviation |
|---|---|---|
| 2.0 minutes | 0.3 minutes | $1 \times 10^{-6}$ |

FIG. 4

| | Subscriber Event Identifier (505) | Panelist Event Identifier (510) | Total Distance (515) | Start Time Difference (520) |
|---|---|---|---|---|
| 550 | 2.1 | A.1 | 1.30 | -0.50 |
| 555 | 2.2 | A.2 | 1.65 | 1.55 |
| 560 | 1.1 | C.1 | 1.83 | -1.02 |
| 565 | 1.2 | C.2 | 1.21 | -1.07 |
| 570 | 1.3 | C.3 | 1.29 | -1.12 |

Candidate Matches Data Table

FIG. 5

|   | A | B | C |
|---|---|---|---|
| 1 | 0 | 0 | 3 |
| 2 | 2 | 0 | 0 |

N Array

FIG. 6

|   | A | B | C |
|---|---|---|---|
| 1 | 0 | 0 | 100% (3/3) |
| 2 | 100% (2/2) | 0 | 0 |

P1 Matrix

FIG. 7

|   | A | B | C |
|---|---|---|---|
| 1 | 0 | 0 | 100% (3/3) |
| 2 | 100% (2/2) | 0 | 0 |

P2 Matrix

FIG. 8

|   | A | B | C |
|---|---|---|---|
| 1 | N/A | N/A | 0.049 |
| 2 | 1.450 | N/A | N/A |

S Matrix

FIG. 9

METHODS AND APPARATUS TO PERFORM IDENTITY MATCHING ACROSS AUDIENCE MEASUREMENT SYSTEMS

RELATED APPLICATION

This patent claims the benefit of, and priority from, U.S. Provisional Patent Application Ser. No. 62/387,535, filed Dec. 28, 2015, entitled "Error resilient matching—determination of identity across multiple, error prone, measurement systems—web-DB2 algorithm." U.S. Provisional Patent Application Ser. No. 62/387,535 is hereby incorporated herein by reference in its entirety.

FIELD OF THE DISCLOSURE

This disclosure relates generally to audience measurement, and, more particularly, to methods and apparatus to perform identity matching across audience measurement systems.

BACKGROUND

Audience measurement of media (e.g., content and/or advertisements presented by any type of medium, such as television, in theater movies, radio, Internet, etc.) is typically carried out by monitoring media exposure of panelists that are statistically selected to represent particular demographic groups. Audience measurement companies, such as The Nielsen Company (US), LLC, enroll households and persons to participate in measurement panels. By enrolling in these measurement panels, households and persons agree to allow the corresponding audience measurement company to monitor their exposure to information presentations, such as media output via a television, a radio, a computer, a smart device, etc. Using various statistical methods, the collected media exposure data is processed to determine the size and/or demographic composition of the audience(s) for media of interest. The audience size and/or demographic information is valuable to, for example, advertisers, broadcasters, content providers, manufacturers, retailers, product developers and/or other entities. For example, audience size and demographic information is a factor in the placement of advertisements, in valuing commercial time slots during a particular program and/or generating ratings for piece(s) of media.

BRIEF DESCRIPTION OF THE DRAWINGS

FIG. 3 is an example data table storing data representing audience measurement events that may be collected by the example matching engine of FIG. 1 and/or FIG. 2.

FIG. 4 is an example data table that may be stored by the example matching engine of FIG. 1 and/or FIG. 2 representing normalized audience measurement events.

FIG. 5 is an example data table that may be stored by the example matching engine of FIG. 1 and/or FIG. 2 representing identified candidate matches.

FIGS. 6-9 are example arrays that may be generated by the example matching engine of FIG. 1 and/or FIG. 2 based on candidate matches.

Wherever possible, the same reference numbers will be used throughout the drawing(s) and accompanying written description to refer to the same or like parts.

DETAILED DESCRIPTION

Figure 1:
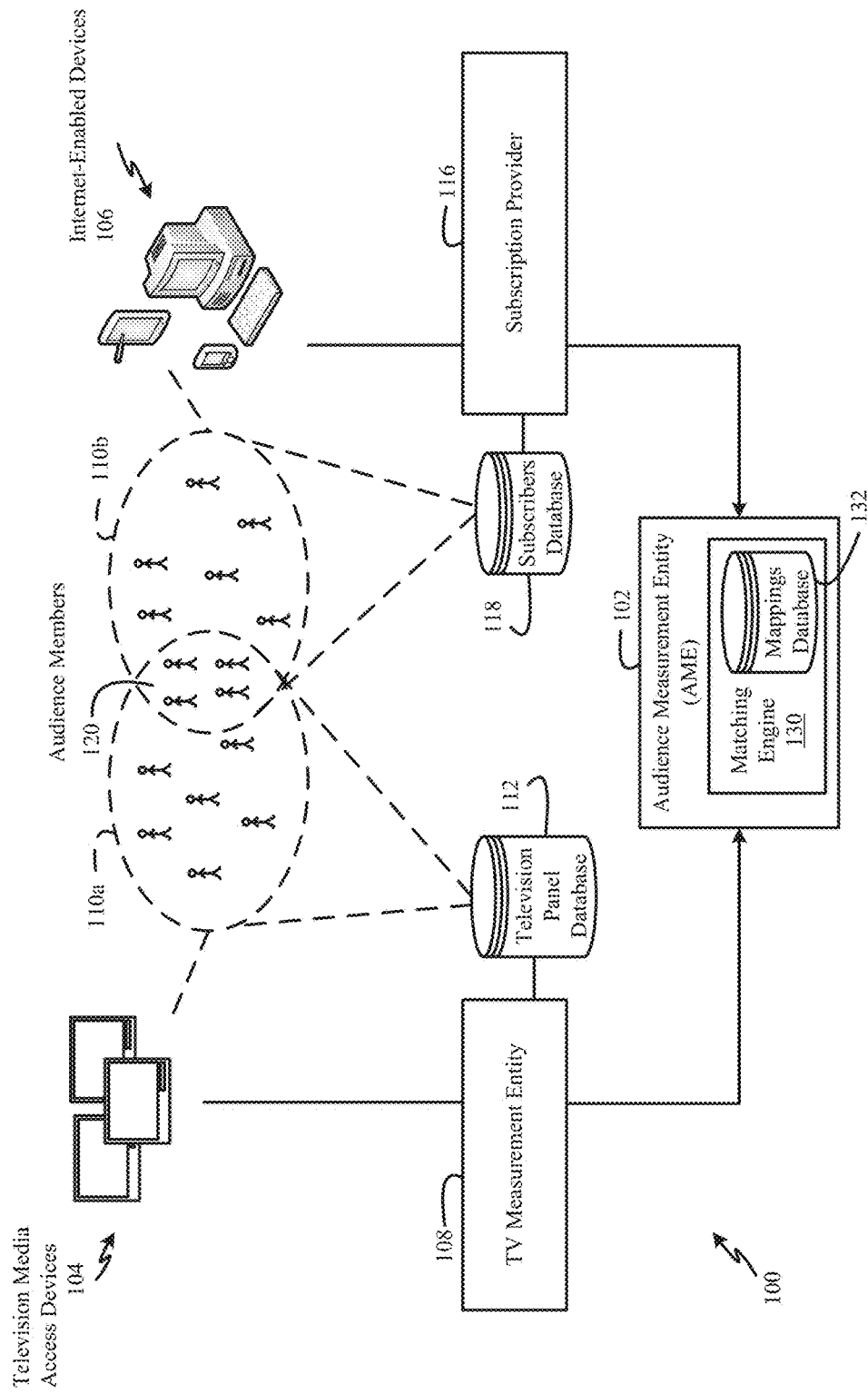
FIG. 1 depicts an example audience measurement environment implemented in accordance with the teachings of this disclose to perform identity matching across audience measurement systems.

Methods, systems and apparatus to perform identity matching across audience measurement systems are disclosed herein. An example apparatus includes a data normalizer to normalize audience measurement events corresponding to media exposure data obtained from a first audience measurement system and a second audience measurement system. The example apparatus also includes a tree builder to build a k-dimensional tree based on normalized audience measurement events corresponding to the first audience measurement system, the k-dimensional tree including a plurality of search spaces. The example apparatus also includes a candidate identifier to identify a search space in the k-dimensional tree based on a query event corresponding to the second audience measurement system, calculate a distance between the query event and a first audience measurement event included in the search space, the first audience measurement event corresponding to the first audience measurement system, and identify the query event and the first audience measurement event as a candidate match when the calculated distance satisfies a distance threshold. The example apparatus also includes an array builder to generate metrics at an identifier-level based on a plurality of candidate matches, and a thresholder to identify an identifier mapping linking a first user identifier associated with the first audience measurement system to a second user identifier associated with the second audience measurement system when the metrics satisfy respective metric thresholds.

In some examples, the apparatus also includes a matrix generator to generate a first matrix based on normalized audience measurement events corresponding to the first audience measurement system, and generate a second matrix based on normalized audience measurement events corresponding to the second audience measurement system. In some examples, a size associated with the first matrix corresponds to (1) a number of normalized audience measurement events corresponding to the first audience measurement system and (2) a number of variables in common between the normalized audience measurement events corresponding to the first audience measurement system and the normalized audience measurement events corresponding to the second audience measurement system.

In some examples, the tree builder compares the size associated with the first matrix to a size associated with the second matrix, and determines the size associated with the first matrix is greater than the size associated with the second matrix when building the k-dimensional tree based on the normalized measurement events corresponding to the first audience measurement system.

In some examples, the array builder builds a first array based on a number of matched events between a first set of user identifiers associated with the first audience measurement system and a second set of user identifiers associated with the second audience measurement system, the first set of user identifiers and the second set of user identifiers included in the plurality of candidate matches. The example array builder also builds a second array based on a first percentage of matched events associated with the first set of user identifiers, builds a third array based on a second percentage of matched events associated with the second set of user identifiers, and builds a fourth array based on clock offsets associated with the plurality of candidate matches.

In some examples, the thresholder compares a first value associated with an identifier combination from the first array to a first threshold, the identifier combination (1) selected from the first set of user identifiers and the second set of user identifiers and (2) associated with a non-zero cell in the first array, compares a first value associated with the identifier combination from the first array to a first threshold, compares a second value associated with the identifier combination from the second array to a second threshold when the first value satisfies the first threshold, compares a third value associated with the identifier combination from the third array to a third threshold when the second value satisfies the second threshold, and compares compare a fourth value associated with the identifier combination from the fourth array to a fourth threshold when the third value satisfies the third threshold.

In some examples, the thresholder records the identifier combination as the identifier mapping when the fourth value satisfies the fourth threshold.

An example method includes normalizing, by executing an instruction with a processor, audience measurement events corresponding to media exposure data obtained from a first audience measurement system and a second audience measurement system. The example method also includes building, by executing an instruction with the processor, a k-dimensional tree based on normalized audience measurement events corresponding to the first audience measurement system, the k-dimensional tree including a plurality of search spaces. The example method also includes identifying, by executing an instruction with the processor, a search space in the k-dimensional tree based on a query event corresponding to the second audience measurement system, calculating, by executing an instruction with the processor, a distance between the query event and a first audience measurement event included in the search space, the first audience measurement event corresponding to the first audience measurement system, and identifying, by executing an instruction with the processor, the query event and the first audience measurement event as a candidate match when the calculated distance satisfies a distance threshold. The example method also includes generating, by executing an instruction with the processor, metrics at an identifier-level based on a plurality of candidate matches, and identifying, by executing an instruction with the processor, an identifier mapping linking a first user identifier associated with the first audience measurement system to a second user identifier associated with the second audience measurement system when the metrics satisfy respective metric thresholds.

In some examples, the method further includes generating a first matrix based on normalized audience measurement events corresponding to the first audience measurement system, and generating a second matrix based on normalized audience measurement events corresponding to the second audience measurement system. In some examples, a size associated with the first matrix corresponds to (1) a number of normalized audience measurement events corresponding to the first audience measurement system and (2) a number of variables in common between the normalized audience measurement events corresponding to the first audience measurement system and the normalized audience measurement events corresponding to the second audience measurement system.

In some examples, building the k-dimensional tree based on the normalized measurement events corresponding to the first audience measurement system includes comparing the size associated with the first matrix to a size associated with the second matrix, and determining the size associated with the first matrix is greater than the size associated with the second matrix.

In some examples, the method further includes building a first array based on a number of matched events between a first set of user identifiers associated with the first audience measurement system and a second set of user identifiers associated with the second audience measurement system, the first set of user identifiers and the second set of user identifiers included in the plurality of candidate matches, building a second array based on a first percentage of matched events associated with the first set of user identifiers, building a third array based on a second percentage of matched events associated with the second set of user identifiers, and building a fourth array based on clock offsets associated with the plurality of candidate matches.

In some examples, the method further includes comparing a first value associated with an identifier combination from the first array to a first threshold, the identifier combination (1) selected from the first set of user identifiers and the second set of user identifiers and (2) associated with a non-zero cell in the first array. The method also includes, in response to determining that the first value satisfies the first threshold, comparing a second value associated with the identifier combination from the second array to a second threshold. The method also includes, in response to determining that the second value satisfies the second threshold, comparing a third value associated with the identifier combination from the third array to a third threshold. The method also includes, in response to determining that that the third value satisfies the third threshold, comparing a fourth value associated with the identifier combination from the fourth array to a fourth threshold.

In some examples, the method further includes recording the identifier combination as the identifier mapping in response to determining that the fourth value satisfies the fourth threshold.

In some examples, the method further includes recording the identifier combination as the identifier mapping in response to determining that the fourth value satisfies the fourth threshold.

An example computer readable storage medium includes instructions that, when executed, cause a machine to normalize audience measurement events corresponding to media exposure data obtained from a first audience measurement system and a second audience measurement system. The example storage medium also includes instructions that, when executed, cause the machine to build k-dimensional tree based on normalized audience measurement events corresponding to the first audience measurement system, the k-dimensional tree including a plurality of search spaces. The example storage medium also includes instructions that, when executed, cause the machine to identify a search space in the k-dimensional tree based on a query event corresponding to the second audience measurement system, calculate a distance between the query event and a first audience measurement event included in the search space, the first audience measurement event corresponding to the first audience measurement system, and identify the query event and the first audience measurement event as a candidate match when the calculated distance satisfies a distance threshold. The example storage medium also includes instructions that, when executed, cause the machine to generate metrics at an identifier-level based on a plurality of candidate matches, and identify an identifier mapping linking a first user identifier associated with the first audience measurement system to a second user identifier associated with the second audience measurement system when the metrics satisfy respective metric thresholds.

In some examples, the instructions, when executed, cause the machine to generate a first matrix based on normalized audience measurement events corresponding to the first audience measurement system, and generate a second matrix based on normalized audience measurement events corresponding to the second audience measurement system. In some examples, a size associated with the first matrix corresponds to (1) a number of normalized audience measurement events corresponding to the first audience measurement system and (2) a number of variables in common between the normalized audience measurement events corresponding to the first audience measurement system and the normalized audience measurement events corresponding to the second audience measurement system.

In some examples, the instructions, when executed, cause the machine to compare the size associated with the first matrix to a size associated with the second matrix, and determine the size associated with the first matrix is greater than the size associated with the second matrix when building the k-dimensional tree based on the normalized measurement events corresponding to the first audience measurement system.

In some examples, the instructions, when executed, cause the machine to build a first array based on a number of matched events between a first set of user identifiers associated with the first audience measurement system and a second set of user identifiers associated with the second audience measurement system, the first set of user identifiers and the second set of user identifiers included in the plurality of candidate matches. The example instructions, when executed, also cause the machine to build a second array based on a first percentage of matched events associated with the first set of user identifiers, build a third array based on a second percentage of matched events associated with the second set of user identifiers, and build a fourth array based on clock offsets associated with the plurality of candidate matches.

In some examples, the instructions, when executed, cause the machine to compare a first value associated with an identifier combination from the first array to a first threshold, the identifier combination (1) selected from the first set of user identifiers and the second set of user identifiers and (2) associated with a non-zero cell in the first array, compare a first value associated with the identifier combination from the first array to a first threshold, compare a second value associated with the identifier combination from the second array to a second threshold when the first value satisfies the first threshold, compare a third value associated with the identifier combination from the third array to a third threshold when the second value satisfies the second threshold, compare a fourth value associated with the identifier combination from the fourth array to a fourth threshold when the third value satisfies the third threshold, and record the identifier combination as the identifier mapping when the fourth value satisfies the fourth threshold.

Examples disclosed herein facilitate performing identity matching across disparate data sets. As used herein, disparate data sets are sets of information collected via different audience measurement systems and, thus, may include different types of information. For example, a first data set collected via a loyalty program may include information such as what stores a user made a purchase at, what products they purchased, etc., a second data set collected via a set-top box may include information such as what media was presented, who was exposed to the media when it was presented, etc.

Recently, an increasing amount of data is being collected at a census level. For example, data is collected with respect to what is watched on television via set-top boxes, what is streamed online via content providers, what is purchased in stores via loyalty programs and/or credit card providers, what is accessed online via Internet service providers and/or data management platforms, etc. This increase in data collection provides audience measurement entities, which generally track activities of panelists, an opportunity to collect, process and/or report on data collected from a relatively larger group.

However, these new sources of data (e.g., census-level data) are often lacking key attributes about the people performing the actions. For example, census-level data collected via a loyalty program may include information about what a user purchased, but may not include demographic information (e.g., age, gender, income, etc.) about the user. In some instances, these attributes (e.g., demographic information) can be imputed through fusion with panelist information. In other instances, a panelist may opt out of the census-level data collecting. In some such instances, fusion may be used to ascribe behavior onto panelists that have opted out of tracking.

In order to perform fusion, examples disclosed herein identify panelists in the census-level data. For example, census-level data may indicate that a cable media service subscriber "001" is enrolled in a sports package through the cable media service. Panelist data may indicate that a panelist "XYZ" is a male age 25-34. By creating a linkage between cable media service subscriber "001" and panelist "XYZ," disclosed examples can fuse the activities (e.g., media viewing behaviors) of subscriber "001" with the attributes (e.g., demographic information) associated with the panelist "XYZ."

Examples disclosed herein include audience measurement systems that collect audience measurement data (e.g., events) from panelists and non-panelists (e.g., census-level data). For example, an audience measurement system may collect media exposure data (e.g., viewing session information) that includes what media was presented, when the media was presented, how long the media was presented, etc. In some examples, viewing sessions for a household may be logged in the panelist data and the census-level data. For example, a cable media service subscriber may provide a set-top box to a household when they subscribe to their cable media services. Likewise, if the household is also registered with an audience measurement entity (AME) (e.g., is a panelist household), the AME may provide a people meter to meter (e.g., log) the media exposure activities of the household.

Examples disclosed herein utilize a two-stage process to perform identity matching across disparate data sets (e.g., to identify panelists in census-level data). For example, disclosed examples perform event-level matching to identify which events included in the panelist data and the census-level data likely correspond to the same viewing session (e.g., "candidate matches"). In some disclosed examples, a matching engine uses k-d trees to perform the event-level matching.

Disclosed examples then perform identifier-level matching on the candidate matches to identify identifier mappings between panelists and subscribers. For example, disclosed examples may use the candidate matches to calculate metrics at an identifier-level and compare the calculated metrics to respective thresholds to identify one-to-one mappings between the identifiers. In some disclosed examples, the matching engine builds sparse arrays based on the candidate matches and selects an identifier mapping based on thresholds applied to the sparse arrays.

FIG. 1 is an illustration of an example environment 100 implemented in accordance with the teachings of this disclosure to facilitate identity matching across audience measurement systems. In the illustrated example of FIG. 1, the environment 100 includes a television (TV)-based audience measurement system that measures exposure to television media delivered via television media access devices 104 and via Internet-enabled devices 106. The television media access devices 104 of the illustrated example include multiple types of devices via which television media is accessible. For example, the television media access devices 104 may include one or more of televisions, smart televisions and/or any other device that can access television media such as broadcast and/or streaming television media. The Internet-enabled devices 106 of the illustrated example include multiple types of devices that can access digital media. For example, the Internet-enabled devices 106 may include one or more of computers, tablet devices, smart phones, smart televisions and/or any other device that can access digital media (e.g., web pages, streaming radio and/or streaming video, pictures, downloadable video, streaming/downloadable music, etc.).

To track television media impressions, a TV measurement entity 108 of the illustrated example recruits audience members to be part of a TV audience member panel 110a by consenting to having their television viewing activities monitored. In some examples, the TV audience member panel 110a is implemented using Nielsen's National People Meter (NPM) panel. The TV measurement entity 108 of the illustrated example maintains a television panel database 112 to store panel member information such as demographics, media preferences and/or other personal or non-personal information suitable for describing characteristics, preferences, locations, etc. of audience members exposed to television media. To measure impressions of television media (e.g., television media including advertisements and/or programming), the TV measurement entity 108 monitors the viewing habits of members of the television audience member panel 110a and records panelist measurement events (e.g., impressions) against different television media to which the television audience member 110a are exposed in the example television panel database 112.

In the illustrated example, an audience measurement entity (AME) 102 operates the TV measurement entity 108. The TV audience member panel 110a of the illustrated example has a relatively small quantity of audience members compared to all TV audience members across a country (e.g., the United States (US)). To effectively increase the quantity of TV audience members, the AME 102 of the illustrated example partners with one or more subscription providers having registered users of their services. In the illustrated example, the AME 102 partners with subscription provider 116 which may be, for example, a media provider (e.g., a cable media provider, a satellite-based media provider, etc.) that maintain(s) subscriber activity records. In some examples, when users register with the subscription provider 116 to use one or more of its services, the users agree to a terms of service (ToS) and/or privacy policy of the subscription provider 116 stating that some subscriber activity information is used to track media (e.g., TV media) viewing activities. The subscription provider 116 of the illustrated example maintains a subscribers database 118 to store user registration information such as demographics, media preferences and/or other personal and/or non-personal information suitable for describing characteristics, preferences, locations, etc. of users registered with the subscription provider 116. To measure impressions of media (e.g., TV media including advertisements and/or programming), the subscription provider 116 monitors activities of its registered users via, for example, a set-top box, and records subscriber measurement events (e.g., impressions) against different media to which the subscription members 110b are exposed. The example subscription provider 116 records the subscriber measurement events in the example subscribers database 118.

As shown in the illustrated example of FIG. 1, some of the TV panelist audience members 110a are also subscription members 110b, resulting in a subset of overlapping audience members 120. In some examples, the overlapping audience members 120 arise when persons in the TV panel audience members 110a also subscribe to the services provided by the subscription provider 116.

In the illustrated example, the TV measurement entity 108 is operated by the AME 102, and the subscription provider 116 is a separate entity from the AME 102. In the illustrated example, the subscription entity 116 does not share identifiers and/or user-level information of its registered users represented in the subscriber user database 118 with the AME 102, and the AME 102 does not share identities and/or user-level information of its panel members represented in the television panel database 112 with the subscription provider 116. In some examples, to honor privacy policies, the AME 102 and the subscription provider 116 do not share identities and/or user-level information about their audience members or registered users. As such, the television panel database 112 is maintained separately from the subscriber user database 118, and the television panel database 112 is not linked to the subscriber user database 118. Because the television panel database 112 is not linked to the subscriber user database 118 and the AME 102 and the subscription provider 116 do not share audience member information and/or registered user information, traditional techniques for identifying audience members who are included in both audiences (e.g., panelists who are also subscribers) may be unsuccessful.

For example, while audience measurement data (e.g., panelist measurement events, subscriber measurement events, etc.) collected by the TV measurement entity 108 and the subscription provider 116 may be similar (e.g., what channel was watched, start time, duration, etc.), often the audience measurement data collected by the TV measurement entity 108 and the subscription provider 116 do not align with each other. Example sources of error (e.g., event misalignment) include asynchronous clocks (e.g., the clocks used by panelist measurement systems to timestamp the panelist measurement events may not be synchronized with the clocks used by subscriber measurement systems to timestamp the subscriber measurement events), differences in measurement precision (e.g., panelist measurement systems may measure and record panelist measurement events at the hundredth level (e.g., 0.01) while subscriber measurement systems may round subscriber measurement data to the nearest integer), attribution error, measurement accuracy, different measured versus modeled information, etc. Furthermore, the number of panelist measurement events and subscriber measurement events may render traditional comparison techniques infeasible. For example, the number of panelist measurement events collected by the TV measurement entity 108 may be in the thousands, while the number of subscriber measurements events collected by the subscription provider 116 may be in the millions. Performing comparisons of all panelist measurement events and subscriber measurement events would result in performing over one trillion comparisons.

In the illustrated example of FIG. 1, the example AME 102 includes a matching engine 130 to create a linkage (e.g., a mapping) between panelists and subscribers. For example, the matching engine 130 may identify a panelist identifier and a subscriber identifier that are associated with the same panelist and record an identifier mapping linking the panelist identifier and the subscriber identifier in an example mappings database 132. The example matching engine 130 creates the identifier mapping linking the panelist identifier and the subscriber identifier using a multi-stage process. For example, the matching engine 130 performs event-level matching to identify panelist measurement events and subscriber measurement events that correspond to the same media event (e.g., candidate matches). Due to the number of comparisons that may be needed to perform the event-level matching, an exhaustive traditional search is computationally unfeasible. As disclosed below in connection with FIG. 2, the example matching engine 130 performs a range search to make the problem of event-level matching computationally tractable. For example, disclosed examples use k-d trees to identify candidate matches between the panelist measurement events and the subscriber measurement events.

The example matching engine 130 of FIG. 1 then performs identifier-level matching on the candidate matches to identify identifier mappings between panelists and subscribers. For example, the example matching engine 130 may use the candidate matches to calculate metrics at an identifier-level and compare the calculated metrics to respective thresholds to identify one-to-one mappings between the identifiers. As disclosed below in connection with FIG. 2, the example matching engine 130 builds sparse arrays based on the candidate matches and selects an identifier mapping based on thresholds applied to the sparse arrays. The example matching engine 130 records the identifier mappings in the example mappings database 132.

In some examples, the matching engine 130 may use the identifier mappings to fuse (e.g., merge) information associated with the corresponding identifiers. For example, the matching engine 130 may use the identifier mappings to merge panel member information (e.g., demographics, media preferences and/or other personal or non-personal information) obtained from the television panel database 112 and the user registration information (e.g., demographics, media preferences and/or other personal and/or non-personal information) obtained from the subscribers database 118. In some examples, to preserve user privacy, the example matching engine 130 may generate profiles for the users based on their respective audience measurement events. For example, the matching engine 130 may generate a profile including viewing behaviors of a subscriber based on the subscriber measurement events associated with the subscriber identifier. The example matching engine 130 may then provide the profile and the corresponding panelist identifier to the TV measurement entity 108 to supplement the panel member information associated with the panelist without providing information (e.g., the subscriber identifier) that may be used to directly identify the subscriber. In this manner, user information collected from different audience measurement systems may be merged.

In the illustrated example of FIG. 1, the example matching engine 130 includes the example mappings database 132 to record identifier mappings linking panelists to subscribers. For example, the mappings database 132 may include an identifier mapping indicating that a panelist identifier and a subscriber identifier are both associated with the same panelist. The example mappings database 132 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example mappings database 132 may additionally or alternatively be implemented by one or more double data rate (DDR) memories, such as DDR, DDR2, DDR3, mobile DDR (mDDR), etc. The example mappings database 132 may additionally or alternatively be implemented by one or more mass storage devices such as hard disk drive(s), compact disk drive(s), digital versatile disk drive(s), etc. While in the illustrated example the mappings database 132 is illustrated as a single database, the mappings database 132 may be implemented by any number and/or type(s) of databases.

Although disclosed examples are described herein in connection with the AME 102 being the implementing entity of such disclosed examples, such disclosed examples may be implemented by the AME 102, by an entity implementing the TV measurement entity 108 separate from the AME 102, by an entity implementing the subscription provider 116 separate from the AME 102, and/or by any other entity interested in generating media impression reports. In some examples, the TV measurement entity 108 and the subscription provider 116 may be implemented by respective entities separate from the AME 102. In other examples, the AME 102 may implement one of the TV measurement entity 108 or the subscription provider 116. In yet other examples, the AME 102 may include or be part of the subscription provider 116.

Furthermore, although disclosed examples are described herein in connection with audience measurement of television media, other types of audience measurement may additionally or alternatively be used. For example, the audience measurement systems may collect audience measurement data related to online media exposure, assets (e.g., products or services) purchased, online activity, etc. In some examples, the subscription providers may collect the subscriber events via loyalty programs or credit card providers, Internet service providers or database proprietors, etc.

Figure 2:
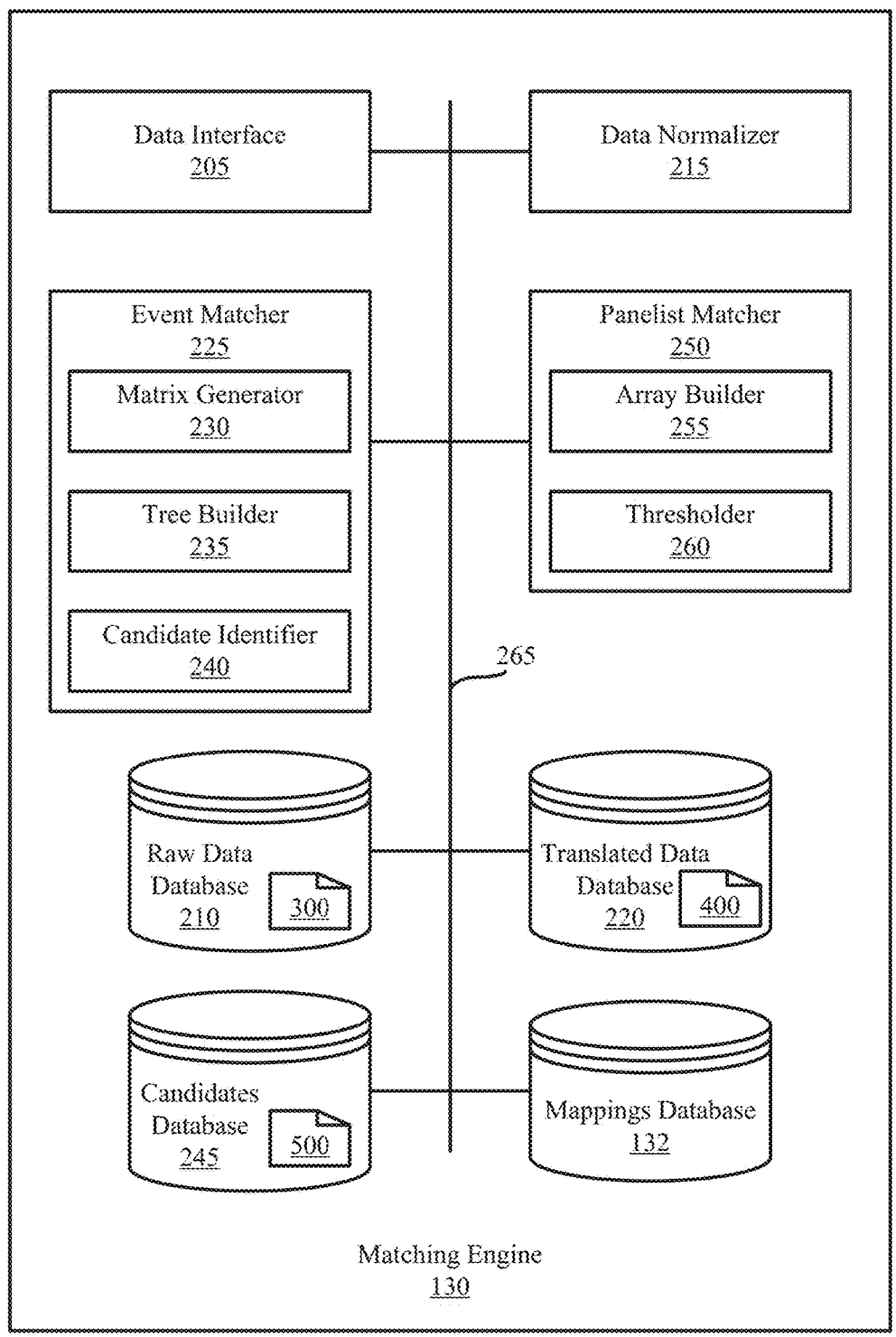
FIG. 2 is a block diagram of an example implementation of the example matching engine of FIG. 1.

FIG. 2 is an example implementation of the matching engine 130 of FIG. 1. The example matching engine 130 of FIG. 2 includes an example data interface 205, an example raw data database 210, an example data normalizer 215, an example translated data database 220, an example event matcher 225, an example candidates database 245, and the example mappings database 132. In the illustrated example of FIG. 2, the example data interface 205, the example raw data database 210, the example data normalizer 215, the example translated data database 220, the example event matcher 225, the example candidates database 245, and the example mappings database 132 are communicatively coupled (e.g., via a bus 265). In the illustrated example of FIG. 2, the example event matcher 235 includes an example matrix generator 230, an example tree builder 235 and an example candidate identifier 240. In the illustrated example of FIG. 2, the example panelist matcher 250 includes an example array builder 255 and an example thresholder 260.

In the illustrated example of FIG. 2, the example matching engine 130 includes the example data interface 205 to provide an interface between audience measurement systems (e.g., the example TV measurement entity 108 and the example subscription provider 116 of FIG. 1) and the matching engine 130. For example, the data interface 205 may be a wired network interface, a wireless network interface, a Bluetooth® network interface, etc. and may include the associated software and/or libraries needed to facilitate communication between the audience measurement systems 108, 116 and the matching engine 130. In the illustrated example of FIG. 1, the data interface 205 receives audience measurement data (e.g., panelist measurement events, subscriber measurement events, etc.) returned by the example audience measurement systems 108, 116. The example data interface 205 records the audience measurement data in the raw data database 210.

In the illustrated example of FIG. 2, the example matching engine 130 includes the example raw data database 210 to record data (e.g., audience measurement data such as panelist measurement events, subscriber measurement events, etc.) provided by the audience measurement entities 108, 116 via the example data interface 205. An example data table 300 of the illustrated example of FIG. 3 illustrates example raw audience measurement data that may be recorded by the data interface 205 in the example raw data database 210.

The example data table 300 of FIG. 3 includes an example user identifier column 305, an example event identifier column 310, an example start time identifier column 315, an example duration identifier column 320 and an example station identifier column 325. The example user identifier column 305 identifies a unique identifier to identify a user. For example, the user identifier may include a handle, a screen name, a panelist identifier, a login or sign-on name, an account number, an email address, an advertising identifier (e.g., an iOS adID, an Android IDFA, etc.), etc. In some examples, the user identifier is an alphanumeric string that uniquely identifies a device associated with a user and/or household. For example, the user identifier may include a Media Access Control (MAC) address, an international mobile equipment identity (IMEI) number, a telephone number, an advertising identifier (e.g., an iOS adID, an Android IDFA, etc.), a cookie, etc.

The example event identifier column 310 identifies respective audience measurement events. In the illustrated example, the event identifiers provide two portions of information. The string of characters before the decimal corresponds to a particular user. The string of numbers after the decimal corresponds to a particular viewing session associated with the user. The example start time identifier column 315 identifies a start time associated with the corresponding audience measurement event. The example duration identifier column 320 identifies a duration associated with the corresponding audience measurement event. In the illustrated example, duration information obtained from panelist measurement systems (e.g., the example TV measurement entity 108) is provided at the ten-thousandth (e.g., 0.0001) level, while duration information obtained from the subscriber measurement systems (e.g., the example subscription provider 116) is provided at the integer-level. The example station identifier column 325 identifies a particular media station associated with the corresponding audience measurement event. While five example columns are represented in the example data table 300 of FIG. 3, many or fewer identifier columns may be included in the example data table 300.

The example data table 300 of FIG. 3 includes audience measurement data obtained from the example TV measurement entity 108 and the example subscription provider 116. In the example data table 300 of FIG. 3, example rows 350, 352, 354, 360, and 362 correspond to subscriber measurement events obtained from the example subscription provider 116. For example, example rows 350, 352 and 354 correspond to subscriber measurement events associated with a "Subscriber 1" who watched "15" minutes of media station "TV 1" at "07:25:31 AM" (e.g., event identifier "1.1"), watched "25" minutes of media station "TV 2" at "12:36:17 PM" (e.g., event identifier "1.2") and watched "47" minutes of media station "TV 3" at "03:57:33 PM" (e.g., event identifier "1.3"). Example rows 360 and 362 correspond to subscriber measurement events associated with a "Subscriber 2" who watched "6" minutes of media station "TV 3" at "07:24:31 AM" (e.g., event identifier "2.1") and watched "23" minutes of media station "TV 4" at "12:39:23 PM" (e.g., event identifier "2.2").

In the example data table 300 of FIG. 3, example rows 370, 372, 380, 382, 384, 390, 392 and 394 correspond to panelist measurement events obtained from the example TV measurement entity 108. For example, rows 370 and 372 correspond to panelist measurement events associated with a "Panelist A" who watched "5.6386" minutes of media station "TV 3" at "07:25:31 AM" (e.g., event identifier "A.1") and watched "22.8894" minutes of media station "TV 4" at "12:36:17 PM" (e.g., event identifier "A.2").

In the example data table 300 of FIG. 3, example rows 380, 382 and 384 correspond to panelist measurement events associated with a "Panelist B" who watched "12.0472" minutes of media station "TV 1" at "07:25:31 AM" (e.g., event identifier "B.1"), watched "33.4051" minutes of media station "TV 2" at "12:36:17 PM" (e.g., event identifier "B.2") and watched "7.5942" minutes of media station "TV 3" at "03:57:33 PM" (e.g., event identifier "B.3").

In the example data table 300 of FIG. 3, example rows 390, 392 and 394 correspond to panelist measurement events associated with a "Panelist C" who watched "14.5442" minutes of media station "TV 1" at "07:25:34 AM" (e.g., event identifier "C.1"), watched "25.1713" minutes of media station "TV 2" at "12:38:25 PM" (e.g., event identifier "C.2") and watched "46.8106" minutes of media station "TV 3" at "03:59:48 PM" (e.g., event identifier "C.3").

Returning to the example matching engine 130 of FIG. 2, the example raw data database 210 may be implemented by a volatile memory (e.g., an SDRAM, DRAM, RDRAM, etc.) and/or a non-volatile memory (e.g., flash memory). The example raw data database 210 may additionally or alternatively be implemented by one or more DDR memories, such as DDR, DDR2, DDR3, mDDR, etc. The example raw data database 210 may additionally or alternatively be implemented by one or more mass storage devices such as hard disk drive(s), compact disk drive(s), digital versatile disk drive(s), etc. While in the illustrated example the raw data database 210 is illustrated as a single database, the raw data database 210 may be implemented by any number and/or type(s) of databases.

The example matching engine 130 of the illustrated example of FIG. 2 performs identity matching across disparate data sets (e.g., audience measurement data collected from different audience measurement systems such as the example TV measurement entity 108 and the example subscription provider 116) using linking variables (e.g., variables that are common to both sets of measurement data). While audience measurement data (e.g., panelist measurement events and subscriber measurement events) may include information related to media impressions, the information collected may differ at a fundamental level. For example, the panelist measurements events may include start times that include hour, minute and seconds information (e.g., 02:13:12), while the subscriber measurement events may include hour and minutes information (e.g., 02:13), duration information may be rounded at different levels of precision, etc.

In the illustrated example of FIG. 2, the example matching engine 130 includes the example data normalizer 215 to transform the audience measurement data from their raw form to be more meaningfully handled when performing identity matching. For example, the example data normalizer 215 may retrieve and/or query audience measurement data recorded in the raw data database 210 and normalize the disparate data to a common scale. The example data normalizer 215 modifies and/or manipulates audience measurement data based on type of data. In the illustrated example of FIG. 2, the data normalizer 215 converts all start times to a minute format (e.g., 12:00:00 AM corresponds to 0.0 minutes, 12:01:30 AM corresponds to 1.5 minutes, etc.). The example data normalizer 215 then applies a start time standard deviation (e.g., 2.0 minutes) to normalize the start times included in the audience measurement data. For example, the data normalizer 215 may divide the converted start time by the start time standard deviation to normalize the start time. To normalize the duration information included in the audience measurement data, the example data normalizer 215 divides a corresponding duration value (e.g., "5.6386" minutes) by a duration standard deviation (e.g., 0.3 minutes) and rounds the result to the one-tenth level (e.g., 18.8 minutes).

The example data normalizer 215 of FIG. 2 converts all station identifiers to a numerical value (e.g., the station identifier "TV 1" is converted to numerical value "1") and then applies a station standard deviation (e.g., $1\times10^{-6}$) to normalize the station identifiers included in the audience measurement data. For example, the data normalizer 215 divides the converted station identifier (e.g., "1") by the station standard deviation (e.g., $1\times10^{-6}$) to normalize the station identifier information. In the illustrated example, the start time standard deviation and the duration standard deviation are determined based on historical data. For example, the start time standard deviation may be determined by combining an expected bias, variance and/or precision errors of the audience measurement data. The example station standard deviation is set to a relatively small value (e.g., one-millionth) so that a comparatively small change in the value corresponds to an incorrect station (e.g., no error is expected in the station). The example data normalizer 215 of FIG. 2 records the normalized audience measurement data in the example translated data database 220.

In some examples, the data normalizer 215 may parse the information included in the audience measurement data to determine whether to further process the information. For example, the data normalizer 215 may determine that an audience measurement data entry includes a start time and an end time, but not duration information. In some such examples, the data normalizer 215 may calculate the duration based on the start time and the end time.

In some examples, the data normalizer 215 may roll-up entries in the audience measurement data based on a preferred level of granularity. For example, the data normalizer 215 may determine that subscriber measurement events recorded in the raw data database 210 are at the household-level, while panelist measurement events recorded in the raw data database 210 are at the individual-level (e.g., at the panelist level). In some such examples, the data normalizer 215 may roll-up panelist measurement events associated with panelists in the same household to the household-level.

In the illustrated example of FIG. 2, the example matching engine 130 includes the example translated data database 220 to record data (e.g., normalized audience measurement data) provided by the data normalizer 215. An example data table 400 of the illustrated example of FIG. 4 illustrates example translated data that may be recorded in the example translated data database 220.

The example data table 400 of FIG. 4 includes an example user identifier column 405, an example event identifier column 410, an example start time identifier column 415, an example duration identifier column 420 and an example station identifier column 425. The example user identifier column 405 identifies a unique identifier to identify a user. For example, the user identifier may include a handle, a screen name, a panelist identifier, a login or sign-on name, an account number, an email address, an advertising identifier (e.g., an iOS adID, an Android IDFA, etc.), etc. In some examples, the user identifier is an alphanumeric string that uniquely identifies a device associated with a user and/or household. For example, the user identifier may include a Media Access Control (MAC) address, an international mobile equipment identity (IMEI) number, a telephone number, an advertising identifier (e.g., an iOS adID, an Android IDFA, etc.), a cookie, etc.

The example event identifier column 410 identifies respective audience measurement events. In the illustrated example, the event identifiers provide two portions of information. The string of characters before the decimal corresponds to a particular user. The string of numbers after the decimal corresponds to a particular viewing session associated with the user. The example start time identifier column 415 identifies a normalized start time associated with the corresponding audience measurement event. As disclosed above, the example data normalizer 215 normalizes the raw start time information by converting the start time to a minutes-format and dividing the converted start time by a start time standard deviation (e.g., 2.0 minutes).

The example duration identifier column 320 identifies a normalized duration associated with the corresponding audience measurement event. As disclosed above, the example data normalizer 215 normalizes the duration information by dividing a duration value by a duration standard deviation (e.g., 0.3 minutes) and rounding the result to the nearest tenth value.

The example station identifier column 325 identifies a normalized media station associated with the corresponding audience measurement event. As disclosed above, the example data normalizer 215 normalizes the media station information by converting the media station to a numerical value and dividing the converted media station by a station standard deviation (e.g., $1\times10^{-6}$).

The example data table 400 of FIG. 4 includes normalized audience measurement data provided by the example data normalizer 215 of FIG. 2. For example, the data normalizer 215 processes the raw audience measurement data recorded in the raw data database 210 and records the normalized audience measurement data in the example translated data database 220 of FIG. 2. For example, the example data normalizer 215 normalizes the example start time "07:25:31 AM" of row 350 of the example data table 300 by first converting the start time into a minutes format (e.g., (7*60)+(25)+(31/60)=445.5167 minutes). The example data normalizer then divides the converted start time (e.g., 445.5167 minutes) by the start time standard deviation (e.g., 2.0 minutes) (e.g., 445.5167/2.0=222.7583) and rounds the result to the nearest tenth value (e.g., 222.8). The example data normalizer 215 then records the normalized start time with the corresponding audience measurement data in the example data table 400 of FIG. 4 (e.g., row 450).

The example data normalizer 215 normalizes the example duration "15 minutes" of row 350 of the example data table 300 by first dividing the duration (e.g., 15) by the duration standard deviation (e.g., 0.3 minutes) (e.g., 15/0.3=50) and rounds the result to the nearest tenth value (e.g., 50.0). The example data normalizer 215 then records the normalized duration with the corresponding audience measurement data in the example data table 400 of FIG. 4 (e.g., row 450).

The example data normalizer 215 normalizes the example station identifier "TV 1" of row 350 of the example data table 300 by first converting the media station to a numerical value (e.g., "1") and dividing the converted media station by the station standard deviation (e.g., $1 \times 10^{-6}$) (e.g., $1/1 \times 10^{-6}$=1,000,000). The example data normalizer 215 then records the normalized station identifier with the corresponding audience measurement data in the example data table 400 of FIG. 4 (e.g., row 450).

As another illustrative example, the data normalizer 215 normalizes the raw audience measurement data of row 384 of the example data table 300 and records the normalized audience measurement data in corresponding row 484 of the example data table 400. For example, the example data normalizer 215 normalizes the example start time "03:57:33 PM" of row 384 of the example data table 300 by first converting the start time into a minutes format (e.g., (15*60)+(57)+(33/60)=957.55 minutes). The example data normalizer then divides the converted start time (e.g., 957.55 minutes) by the start time standard deviation (e.g., 2.0 minutes) (e.g., 957.55/2.0=478.775) and rounds the result to the nearest tenth value (e.g., 478.8). The example data normalizer 215 then records the normalized start time (478.8) with the corresponding normalized audience measurement data in the example data table 400 of FIG. 4 (e.g., row 484).

The example data normalizer 215 normalizes the example duration "7.5942 minutes" of row 384 of the example data table 300 by first dividing the duration (e.g., 7.5942) by the duration standard deviation (e.g., 0.3 minutes) (e.g., 7.5942/0.3=25.314) and rounds the result to the nearest tenth value (e.g., 25.3). The example data normalizer 215 then records the normalized duration (e.g., 25.3) with the corresponding normalized audience measurement data in the example data table 400 of FIG. 4 (e.g., row 484).

The example data normalizer 215 normalizes the example station identifier "TV 3" of row 384 of the example data table 300 by first converting the media station to a numerical value (e.g., "3") and dividing the converted media station by the station standard deviation (e.g., $1 \times 10^{-6}$) (e.g., $3/1 \times 10^{-6}$=3,000,000). The example data normalizer 215 then records the normalized station identifier (e.g., 3,000,000) with the corresponding normalized audience measurement data in the example data table 400 of FIG. 4 (e.g., row 484).

Returning to the example matching engine 130 of FIG. 2, the example translated data database 220 may be implemented by a volatile memory (e.g., an SDRAM, DRAM, RDRAM, etc.) and/or a non-volatile memory (e.g., flash memory). The example translated data database 220 may additionally or alternatively be implemented by one or more DDR memories, such as DDR, DDR2, DDR3, mDDR, etc. The example translated data database 220 may additionally or alternatively be implemented by one or more mass storage devices such as hard disk drive(s), compact disk drive(s), digital versatile disk drive(s), etc. While in the illustrated example the translated data database 220 is illustrated as a single database, the translated data database 220 may be implemented by any number and/or type(s) of databases.

In the illustrated example of FIG. 2, the example matching engine 130 includes the example event matcher 225 to identify matches between panelist measurement events and subscriber measurement events. For example, the event matcher 225 compares the panelist measurement events and the subscriber measurement events included in the translated data database 220 to determine which measurement events are associated with the same viewing sessions. However, as discussed above, in view of the relatively large number of comparisons that would be needed across both sets of measurement events, applying traditional search techniques is computationally unfeasible. Furthermore, errors and/or biases at one or more of the audience measurement systems may cause the same event to appear misaligned, for example, due to asynchronous clocks, variance in degrees of precision, etc. To facilitate identifying matches at the event-level, the example event matcher 225 includes the example matrix generator 230, the example tree builder 235, and the example candidate identifier 240.

In the illustrated example of FIG. 2, the example event matcher 225 includes the example matrix generator 230 to generate matrices ($M_i$) for the respective sets of measurement events included in the example translated data database 220 (e.g., normalized audience measurement events). For example, the matrix generator 230 may generate a first matrix based on panelist measurement events ($M_{panelist}$) and generate a second matrix based on subscriber measurement events ($M_{subscriber}$). In the illustrated example of FIG. 2, the matrix generator 230 generates the respective matrices ($M_i$) of size ($n_{events}$) by ($n_{variables}$). For example, the rows included in a panelist matrix ($M_{panelist}$) may correspond to different panelist measurement events included in the translated data database 220 and the columns included in the panelist matrix ($M_{panelist}$) may correspond to the linking variables (e.g., start time, duration, station identifier, etc.) that are common to the panelist measurement events and the subscriber measurement events. Thus, in the illustrated example, the size of the panelist ($M_{panelist}$) generated by the example matrix generator 230 corresponds to (1) the number of audience measurement events corresponding to panelist events and (2) the number of variables common to the panelist measurement events and the subscriber measurement events.

In the illustrated example of FIG. 2, the example event matcher 225 includes the example tree builder 235 to build a k-dimensional ("k-d") tree based on the matrices generated by the example matrix generator 230. In the illustrated example of FIG. 2, the tree builder 235 converts the matrix associated with the relatively larger size (e.g., the matrix having more measurement events) to the k-d tree. For example, the tree builder 235 may determine that the number of panelist measurement events in the panelist matrix ($M_{panelist}$) is in the thousands, while the number of subscriber measurement events included in the subscriber matrix ($M_{subscriber}$) is in the millions. The example tree builder 235 converts the selected matrix (e.g., the subscriber matrix ($M_{subscriber}$)) into the k-d tree using any known algorithm.

A k-d tree is a data structure that maps nodes (e.g., events) in a k-dimensional space. The example tree builder 235 then partitions the k-dimensional space into search spaces (e.g., quadrants in a 3-D space). In the illustrated example, the boundaries of the search spaces of the k-d tree are determined by calculating the median value of the events along the respective dimensions. However, other techniques for determining the boundaries of the search spaces of the k-d tree may additionally or alternatively be used.

By converting the selected matrix (e.g., the subscriber matrix ($M_{subscriber}$)) into a k-d tree, the example tree builder 235 facilitates identifying matching events (e.g., events corresponding to the same viewing session) using range searching rather than, for example, traditional comparison methods. In the illustrated example of FIG. 2, the example event matcher 225 includes the example candidate identifier 240 to identify candidate matches that may be used to map (e.g., link) a panelist identifier to a subscriber identifier. The example candidate identifier 240 applies events from the non-selected matrix (e.g., the matrix associated with the smaller number of measurement events (e.g., the panelist matrix ($M_{panelist}$))) to the k-d tree to identify events that are within a threshold distance ($distance_T$) of each other. For example, the candidate identifier 240 selects a panelist measurement event (also referred to as a "query event") and identifies a search space in the k-d tree based on the "coordinates" of the selected panelist event (e.g., the start time information, the duration information and the station identifier information). The example candidate identifier 240 then calculates distances between the selected query event and the respective subscriber events included in the identified search space. In the illustrated example of FIG. 2, the candidate identifier 240 applies example Equation 1 below to calculate the distance between two measurement events.

$$\text{distance} = \sqrt{(A)^2 + (B)^2 + (C)^2} \qquad \text{Equation 1:}$$

In example Equation 1 above, the first example variable (A) represents a difference between normalized start times of two events. In example Equation 1 above, the second example variable (B) represents a difference between normalized durations of two events. In example Equation 1 above, the third example variable (C) represents a difference between normalized station identifiers of two events. In the illustrated example of FIG. 2, if the example candidate identifier 240 determines that the calculated distance (distance) satisfies a distance threshold ($distance_T$) (e.g., is less than or equal to the distance threshold), the candidate identifier 240 identifies the two events as a candidate match. In the illustrated example of FIG. 2, the example candidate identifier 240 records candidate matches in the example candidates database 245. For example, the candidate identifier 240 may record the panelist event identifier and the subscriber event identifier associated with the two events, the calculated distance between the two events, the difference in start times between the two events, etc. associated with the candidate matches in the example candidates database 245.

In the illustrated example of FIG. 2, the example event matching engine 130 includes the example candidates database 245 to record candidate matches identified by the candidate identifier 240. An example data table 500 of the illustrated example of FIG. 5 illustrates example candidate matches identified by the example candidate identifier 240 that may be recorded in the example candidates database 245. The example data table 500 of FIG. 5 includes an example subscriber event identifier column 505, an example panelist event identifier column 510, an example total distance identifier column 515 and an example start time different identifier column 520. The example subscriber event identifier column 505 identifies a subscriber measurement event associated with a candidate match. The example panelist event identifier column 510 identifies a panelist measurement event associated with a candidate match. In the illustrated example, the subscriber event identifiers and the panelist event identifiers provide two portions of information. The string of characters before the decimal represents a particular panelist identifier or a particular subscriber identifier. The string of numbers after the decimal represents particular viewing sessions. The example total distance identifier column 515 identifies the distance between the corresponding events. The example start time difference identifier column 520 identifies a difference in start time between the corresponding events. In the illustrated example, the start time difference represents the offset from the start time included in the subscriber event based on the panelist event. For example, a positive start time difference indicates that the start time associated with the panelist measurement event is earlier than the start time associated with the subscriber measurement event. Likewise, a negative start time difference indicates that the start time associated with the subscriber measurement event is earlier than the start time associated with the panelist measurement event. While four example columns are represented in the example data table 500 of FIG. 5, many or fewer identifier columns may be included in the example data table 500.

The example data table 500 of FIG. 5 includes five example rows corresponding to five example candidate matches identified by the example candidate identifier 240 of the event matcher 225. The first example row 550 indicates that the first viewing session associated with the subscriber identifier "2" (e.g., subscriber measurement event "2.1") matches the first viewing session associated with the panelist identifier "A" (e.g., panelist measurement event "A.1"). The first example row 550 also indicates that the total distance between the corresponding measurement events (e.g., the subscriber measurement event "2.1" and the panelist measurement event "A.1") is "1.30" units. To determine the total distance between the corresponding measurement events (e.g., the subscriber measurement event "2.1" and the panelist measurement event "A.1"), the example candidate identifier 240 of FIG. 2 applies Equation 1 (reproduced below with example values).

$$\text{Equation 1}$$
$$\text{distance} = \sqrt{(A)^2 + (B)^2 + (C)^2} =$$
$$\sqrt{(222.8 - 222.3)^2 + (18.8 - 20)^2 + (3,000,000 - 3,000,000)^2} =$$
$$\sqrt{(0.5)^2 + (-1.2)^2 + (0)^2} = \sqrt{1.69} = 1.3$$

The first example row 550 also indicates that the start time associated with the subscriber measurement event is "0.5" minutes earlier than the start time associated with the panelist measurement event.

In the example data table 500 of FIG. 5, the second example row 555 indicates that the second viewing session associated with the subscriber identifier "2" (e.g., subscriber measurement event "2.2") matches the second viewing session associated with the panelist identifier "A" (e.g., panelist measurement event "A.2"). The second example row 555 also indicates that the total distance between the corresponding measurement events (e.g., the subscriber measurement event "2.2" and the panelist measurement event "A.2") is "1.65" units. To determine the total distance between the corresponding measurement events (e.g., the subscriber measurement event "2.2" and the panelist measurement event "A.2"), the example candidate identifier 240 of FIG. 2 applies Equation 1 (reproduced below with example values).

$$\text{distance} = \sqrt{(A)^2 + (B)^2 + (C)^2} =$$
$$\sqrt{(378.1 - 379.7)^2 + (76.3 - 76.7)^2 + (4,000,000 - 4,000,000)^2} =$$
$$\sqrt{(-1.6)^2 + (-0.4)^2 + (0)^2} = \sqrt{2.72} = 1.65$$

Equation 1

The second example row 555 also indicates that the start time associated with the panelist measurement event is "1.6" minutes earlier than the start time associated with the subscriber measurement event.

In the example data table 500 of FIG. 5, the third example row 560 indicates that the first viewing session associated with the subscriber identifier "1" (e.g., subscriber measurement event "1.1") matches the first viewing session associated with the panelist identifier "C" (e.g., panelist measurement event "C.1"). The third example row 560 also indicates that the total distance between the corresponding events (e.g., the subscriber measurement event "1.1" and the panelist measurement event "C.1") is "1.83" units and that the start time associated with the subscriber measurement event is "1.02" minutes earlier than the start time associated with the panelist measurement event.

In the example data table 500 of FIG. 5, the fourth example row 565 indicates that the second viewing session associated with the subscriber identifier "1" (e.g., subscriber measurement event "1.2") matches the second viewing session associated with the panelist identifier "C" (e.g., panelist measurement event "C.2"). The fourth example row 565 also indicates that the total distance between the corresponding events (e.g., the subscriber measurement event "1.2" and the panelist measurement event "C.2") is "1.21" units and that the start time associated with the subscriber measurement event is "1.07" minutes earlier than the start time associated with the panelist measurement event.

In the example data table 500 of FIG. 5, the fifth example row 570 indicates that the third viewing session associated with the subscriber identifier "1" (e.g., subscriber measurement event "1.3") matches the third viewing session associated with the panelist identifier "C" (e.g., panelist measurement event "C.3"). The fifth example row 570 also indicates that the total distance between the corresponding events (e.g., the subscriber measurement event "1.3" and the panelist measurement event "C.3") is "1.29" units and that the start time associated with the subscriber event is "1.12" minutes earlier than the start time associated with the panelist measurement event.

While five example candidate matches are represented in the example data table 500 of FIG. 5, more of fewer candidate matches may be represented in the example data table 500 corresponding to the number of candidate matches identified by the example candidate identifier 240 of FIG. 2.

Returning to the example matching engine 130 of FIG. 2, the example candidates database 245 may be implemented by a volatile memory (e.g., an SDRAM, DRAM, RDRAM, etc.) and/or a non-volatile memory (e.g., flash memory). The example candidates database 245 may additionally or alternatively be implemented by one or more DDR memories, such as DDR, DDR2, DDR3, mDDR, etc. The example candidates database 245 may additionally or alternatively be implemented by one or more mass storage devices such as hard disk drive(s), compact disk drive(s), digital versatile disk drive(s), etc. While in the illustrated example the candidates database 245 is illustrated as a single database, the candidates database 245 may be implemented by any number and/or type(s) of databases.

In the illustrated example of FIG. 2, the example event matching engine 130 includes the example panelist matcher 250 to map panelists to subscribers based on the candidate matches included in the example candidates database 245. For example, the panelist matcher 250 may process the candidate matches, which may be many-to-many matches (e.g., the identified panelist measurement events include a plurality of panelist identifiers and the identified subscriber measurement events include a plurality of subscriber identifiers), to identity one-to-one matches between panelist identifiers and subscriber identifiers. The example panelists matcher 250 of FIG. 2 includes the example array builder 255 and the example thresholder 260.

In the illustrated example of FIG. 2, the example panelist matcher 250 includes the example array builder 255 to build arrays of size ($n_{panelist\_IDs}$) by ($n_{subscriber\_IDs}$) based on the candidate matches included in the example candidates database 245. For example, the array builder 255 may parse the candidates database 245 and set the unique panelist identifiers as the rows of the arrays and use the unique subscriber identifiers as the columns of the arrays. The example array builder 255 of FIG. 2 builds four example arrays ($N_{i,j}$), ($P_{1(i,j)}$), ($P_{2(i,j)}$), ($S_{i,j}$) by accumulating metrics associated with the candidate matches at the identifier-level.

Figures 6, 7, 8, 9:
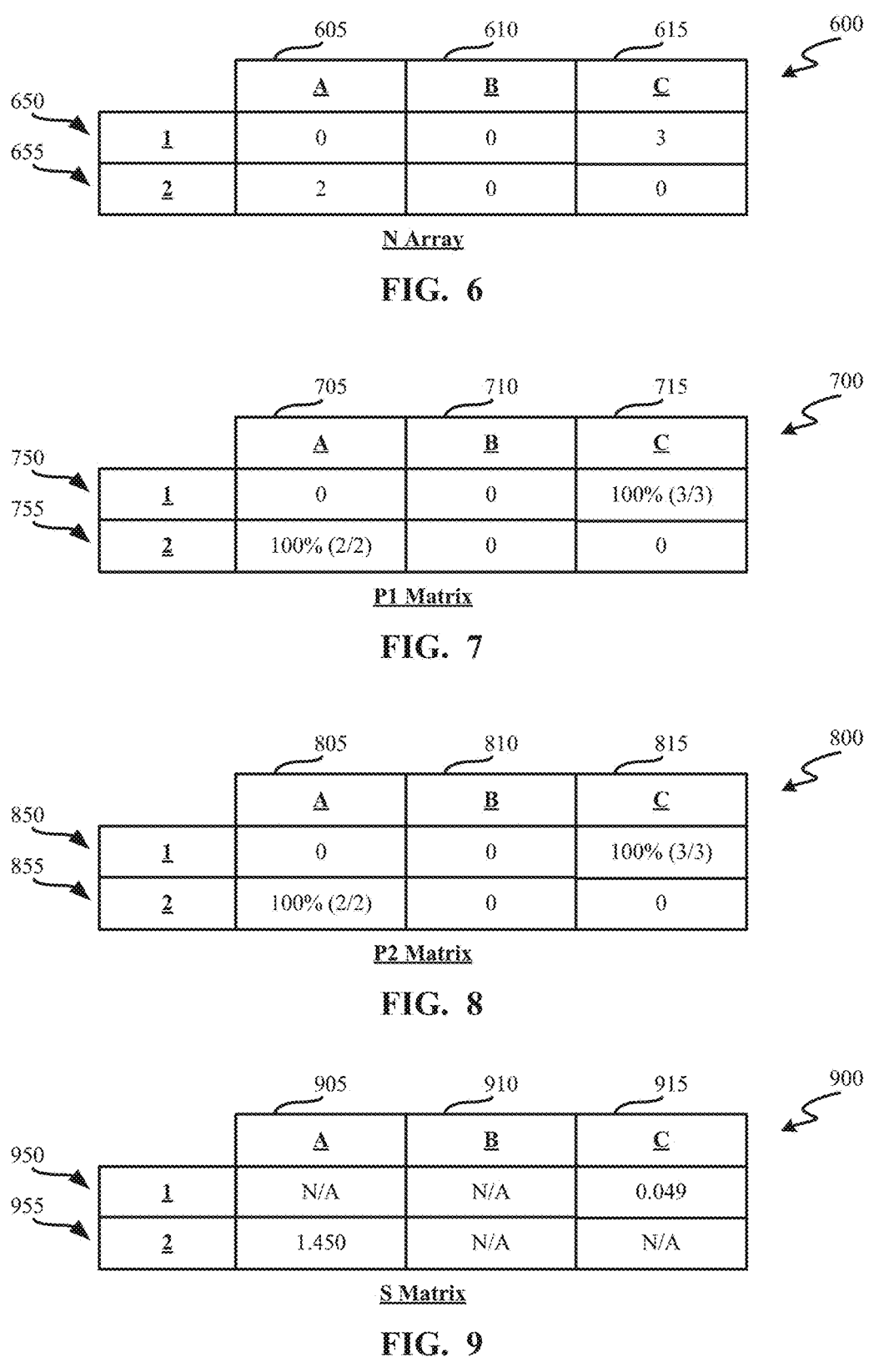

In the illustrated example of FIG. 2, the example array builder 255 builds the example ($N_{i,j}$) array by identifying the number of matched events between an $i^{th}$ panelist identifier and a $j^{th}$ subscriber identifier identified in the example candidates database 245. FIG. 6 illustrates an example ($N_{i,j}$) array 600 based on the candidate matches included in the example data table 500 of FIG. 5. In the illustrated ($N_{i,j}$) array 600 of FIG. 6, the example columns 605, 610, 615 represent unique panelist identifiers "A," "B," "C," respectively. The example rows 650, 655 of the example ($N_{i,j}$) array 600 of FIG. 6 represent unique subscriber identifiers "1," "2," respectively. Referring to the candidate matches included in the example data table 500, the subscriber identifier "1" matched with the panelist identifier "C" three times and did not match the panelist identifiers "A" or "B." The subscriber identifier "2" matched with the panelist identifier "A" two times and did not match with the panelist identifiers "B" or "C." The example ($N_{i,j}$) array 600 accordingly reflects the number of matched measurement events between the corresponding panelist and subscriber identifiers. For example, the cell corresponding to identifier combination (C, 1) indicates three matches and the cell corresponding to identifier combination (A, 2) indicates two matches. The other cells of the example ($N_{i,j}$) array 600 are set to zero.

In the illustrated example of FIG. 2, the example array builder 255 builds the example ($P_{1(i,j)}$) array by calculating a first percentage of events associated with the $i^{th}$ panelist identifier that are determined matches to events from the $j^{th}$ subscriber identifier identified in the example candidates database 245. FIG. 7 illustrates an example ($P_{1(i,j)}$) array 700 based on the candidate matches included in the example data table 500 of FIG. 5. In the illustrated ($P_{1(i,j)}$) array 700 of FIG. 7, the example columns 705, 710, 715 represent unique panelist identifiers "A," "B," "C," respectively. The example rows 750, 755 of the example ($P_{1(i,j)}$) array 700 of FIG. 7 represent unique subscriber identifiers "1," "2," respectively. Referring to the example candidate matches included in the example data table 500, the panelist identifier "A" matched with the subscriber identifier "2" two out of two times and did not match with the subscriber identifier "1." Thus, 100% (e.g., 2 out of 2) of the events associated with panelist identifier "A" are determined matches to events from the subscriber identifier "2." Similarly, the panelist identifier "C" matched with the subscriber identifier "1" three out of three times and did not match with the subscriber identifier "2." Thus, 100% (e.g., 3 out of 3) of the events associated with panelist identifier "C" are determined matches to events from the subscriber identifier "1." The example ($P_{1(i,j)}$) array 700 accordingly reflects the percentage of events associated with the $i^{th}$ panelist identifier that are determined matches to events from the $j^{th}$ subscriber identifier identified in the example candidates database 245. For example, the cell corresponding to identifier combination (C, 1) indicates 100% matches and the cell corresponding to identifier combination (A, 2) indicates 100% matches. The other cells of the example ($P_{1(i,j)}$) array 700 are set to zero.

In the illustrated example of FIG. 2, the example array builder 255 builds the example ($P_{2(i,j)}$) array by calculating a second percentage of events associated with the $j^{th}$ subscriber identifier that are determined matches to events from the $i^{th}$ panelist identifier identified in the example candidates database 245. FIG. 8 illustrates an example ($P_{2(i,j)}$) array 800 based on the candidates matches included in the example data table 500 of FIG. 5. In the illustrated ($P_{2(i,j)}$) array 800 of FIG. 8, the example columns 805, 810, 815 represent unique panelist identifiers "A," "B," "C," respectively. The example rows 850, 855 of the example ($P_{2(i,j)}$) array 800 of FIG. 8 represent unique subscriber identifiers "1," "2," respectively. Referring to the example candidate matches included in the example data table 500, the subscriber identifier "1" matched with the panelist identifier "C" three out of three times and did not match with the panelist identifiers "A" or "B." Thus, 100% (e.g., 3 out of 3) of the events associated with subscriber identifier "1" are determined matches to events from the panelist identifier "C." Similarly, the subscriber identifier "2" matched with the panelist identifier "A" two out of two times and did not match with the panelist identifier "B" or "C." Thus, 100% (e.g., 2 out of 2) of the events associated with subscriber identifier "2" are determined matches to events from the panelist identifier "A." The example ($P_{2(i,j)}$) array 800 accordingly reflects the percentage of events associated with the $j^{th}$ subscriber identifier that are determined matches to events from the $i^{th}$ panelist identifier identified in the example candidates database 245. For example, the cell corresponding to identifier combination (C, 1) indicates 100% matches and the cell corresponding to identifier combination (A, 2) indicates 100% matches. The other cells of the example ($P_{2(i,j)}$) array 800 are set to zero.

In the illustrated example of FIG. 2, the example array builder 255 builds the example ($S_{i,j}$) array by calculating a variance (e.g., a standard deviation) in clock offsets between the $i^{th}$ panelist identifier and the $j^{th}$ subscriber identifier. For example, the array builder 255 may calculate the variance in clock offsets based on the start time differences included in the candidates database 245 of FIG. 2. FIG. 9 illustrates an example ($S_{i,j}$) array 900 based on the candidate matches included in the example data table 500 of FIG. 5. In the illustrated ($S_{i,j}$) array 900 of FIG. 9, the example columns 905, 910, 915 represent unique panelist identifiers "A," "B," "C," respectively. The example rows 950, 955 of the example ($S_{i,j}$) array 900 of FIG. 9 represent unique subscriber identifiers "1," "2," respectively. Referring to the example candidate matches included in the example data table 500, the clock offsets between the panelist identifier "A" and the subscriber identifier "2" are "−0.50" and "1.55." In the illustrated example, the example array builder 255 calculates the variance in clock offsets of the panelist identifier "A" and the subscriber identifier "2" as "1.450." Similarly, the clock offsets between the panelist identifier "C" and the subscriber identifier "1" are "−1.02," "−1.07" and "−1.12." In the illustrated example, the example array builder 255 calculates the variance in clock offsets of the panelist identifier "C" and the subscriber identifier "1" as "0.049." The example ($S_{i,j}$) array 900 accordingly reflects the variances in clock offsets between the $i^{th}$ panelist identifier and the $j^{th}$ subscriber identifier. In the illustrated example, because clock offsets were not calculated for other identifier combinations (panelist$_i$, subscriber$_j$), the corresponding cells of the example ($S_{i,j}$) array 900 are set to "N/A" ("not available") rather than to zero.

As shown above in connection with the arrays 600, 700, 800 and 900 of FIGS. 6, 7, 8 and 9, respectively, the majority of the cells are set to zero. As a result, the arrays 600, 700, 800, 900 of FIGS. 6, 7, 8 and/or 9 may be referred to as "sparse arrays" or "sparse matrices."

In the illustrated example of FIG. 2, the example panelist matcher 250 includes the example thresholder 260 to apply respective metric thresholds to the corresponding arrays generated by the example array builder 255. The example thresholder 260 then selects identifier combinations (panelist$_i$, subscriber$_j$) as identifier mappings that link a panelist identifier to a subscriber identifier based on the outcome of the applied metric thresholds.

In the illustrated example of FIG. 2, the example thresholder 260 applies a first threshold ($n_T$) to the ($N_{i,j}$) array to determine that an identifier combination (panelist$_i$, subscriber$_j$) satisfies a minimum number of matched events. For example, the thresholder 260 may select an identifier combination (panelist$_i$, subscriber$_j$) and determine whether the number of matches associated with the selected identifier combination (panelist$_i$, subscriber$_j$) is greater than or equal to the first threshold ($n_T$) (e.g., two matches). In the illustrated example, by setting the first threshold ($n_T$) to 2 matches and applying the first threshold ($n_T$) to the example ($N_{i,j}$) array 600 of FIG. 6, the example thresholder 260 determines that the number of matches associated with the first identifier combination (C, 1) (e.g., "3") and the number of matches associated with the second identifier combination (A, 2) (e.g., "2") satisfy the first threshold ($n_T$).

In the illustrated example of FIG. 2, the example thresholder 260 applies a second threshold ($P1_T$) to the ($P_{1(i,j)}$) array to determine that an identifier combination (panelist$_i$, subscriber$_j$) satisfies a minimum percentage of panelist matched events. For example, the thresholder 260 may select an identifier combination (panelist$_i$, subscriber$_j$) and determine whether the percentages of matches associated with the selected identifier combination (panelist$_i$, subscriber$_j$) is greater than or equal to the second threshold ($P1_T$) (e.g., 90%). In the illustrated example, by setting the second threshold ($P1_T$) to 90% and applying the second threshold ($P1_T$) to the example ($P_{1(i,j)}$) array 700 of FIG. 7, the example thresholder 260 determines that the percentage associated with the first identifier combination (C, 1) (e.g., "100%") and that the percentage associated with the second identifier combination (A, 2) (e.g., "100%") satisfy the second threshold ($P1_T$).

In the illustrated example of FIG. 2, the example thresholder 260 applies a third threshold ($P2_T$) to the ($P_{2(i,j)}$) array to determine that an identifier combination (panelist$_i$, subscriber$_j$) satisfies a minimum percentage of subscriber matched events. For example, the thresholder 260 may select an identifier combination (panelist$_i$, subscriber$_j$) and determine whether the percentages of matches associated with the selected identifier combination (panelist$_i$, subscriber$_j$) is greater than or equal to the third threshold ($P2_T$) (e.g., 90%). In the illustrated example, by setting the third threshold ($P2_T$) to 90% and applying the third threshold ($P2_T$) to the example ($P_{2(i,j)}$) array 800 of FIG. 8, the example thresholder 260 determines that the percentage associated with the first identifier combination (C, 1) (e.g., "100%") and that the percentage associated with the second identifier combination (A, 2) (e.g., "100%") satisfy the second threshold ($P1_T$).

In the illustrated example of FIG. 2, the example thresholder 260 applies a fourth threshold ($S_T$) to the ($S_{i,j}$) array to determine that an identifier combination (panelist$_i$, subscriber$_j$) satisfies a maximum variance in clock offset. For example, the thresholder 260 may select an identifier combination (panelist$_i$, subscriber$_j$) and determine whether the variance associated with the selected identifier combination (panelist$_i$, subscriber$_j$) is less than or equal to the fourth threshold ($S_T$) (e.g., 0.5). In the illustrated example, by setting the fourth threshold ($S_T$) to 0.5 and applying the fourth threshold ($S_T$) to the example ($S_{i,j}$) array 900 of FIG. 9, the example thresholder 260 determines that the variance associated with the first identifier combination (C, 1) (e.g., "0.49") satisfies the fourth threshold ($S_T$) and that the variance associated with the second identifier combination (A, 2) (e.g., "1.450") does not satisfy the fourth threshold ($S_T$).

In the illustrated example of FIG. 2, the example thresholder 260 determines that an identifier combination (panelist$_i$, subscriber$_j$) is an identifier mapping that links a panelist identifier to a subscriber identifier when the identifier combination (panelist$_i$, subscriber$_j$) satisfies each of the thresholds associated with the corresponding arrays. For example, referring to the example arrays 600, 700, 800, 900 of FIGS. 6-9, the example first identifier combination (C, 1) satisfies all four thresholds. In contrast, the example second identifier combination (A, 2) did not satisfy all four thresholds (e.g., the variance associated with the second identifier combination (A, 2) was greater than the fourth threshold ($S_T$)). In the illustrated example of FIG. 2, the example thresholder 260 records the first identification combination (C, 1) in the example mappings database 132 to link the panelist identifier (e.g., "C") to the corresponding subscriber identifier (e.g., "1").

In some examples, the thresholder 260 may not identify a single panelist identifier that maps to a single subscriber identifier (e.g., the thresholder 260 identifies one-to-many mappings). For example, the thresholder 260 may determine that identifier combinations of two or more subscriber identifiers and a panelist identifier (e.g., identifier combination (panelist$_1$, subscriber$_1$), identifier combination (panelist$_1$, subscriber$_2$), . . . identifier combination (panelist$_1$, subscriber$_n$)) satisfy each of the four thresholds. Additionally or alternatively, the thresholder 260 may determine that identifier combinations of two or more panelist identifiers and a subscriber identifier (e.g., identifier combination (panelist$_1$, subscriber$_1$), identifier combination (panelist$_2$, subscriber$_1$), . . . identifier combination (panelist$_n$, subscriber$_1$)) satisfy each of the four thresholds. In some examples, the thresholder 260 may record each of the identified identifier combinations in the example mappings database 132. In some examples, the thresholder 260 may select one of the identifier combinations by ranking (e.g., sorting) the identified identifier combinations based on one or more of the metrics used by the example array builder 255 when building the arrays. For example, the thresholder 260 may select a set of one-to-many mappings and sum the first percentage ($P_{1(i,j)}$) and the second percentage ($P_{2(i,j)}$) of the selected mappings. The example thresholder 260 may then select the identified combination with the highest combined value. In some examples, the thresholder 260 may randomly select an identified combination of a set of one-to-many mappings to record in the mappings database 132. However, the example thresholder 260 may additionally or alternatively use other techniques for selecting a single identifier combination from two or more identifier combinations (e.g., select a one-to-one mapping from a set of one-to-many mappings).

In the illustrated example of FIG. 2, the example thresholder 260 applies thresholds that are set based on experimental results. In some examples, the values of the example thresholds may be modified to adjust the level of acceptable risk in identifying matching identifiers. For example, setting the thresholds to a relatively high value may decrease the likelihood of identifying matching identifiers (e.g., identifier combinations). In contrast, setting the thresholds to a relatively low value may increase the likelihood of false positives.

While an example manner of implementing the matching engine 130 of FIG. 1 is illustrated in FIG. 2, one or more of the elements, processes and/or devices illustrated in FIG. 2 may be combined, divided, re-arranged, omitted, eliminated and/or implemented in any other way. Further, the example mappings database 132, the example data interface 205, the example raw data database 210, the example data normalizer 215, the example translated data database 220, the example event matcher 225, the example matrix generator 230, the example tree builder 235, the example candidate identifier 240, the example candidates database 245, the example panelist matcher 250, the example array builder 255, the example thresholder 260 and/or, more generally, the example matching engine 130 of FIG. 1 may be implemented by hardware, software, firmware and/or any combination of hardware, software and/or firmware. Thus, for example, any of the example mappings database 132, the example data interface 205, the example raw data database 210, the example data normalizer 215, the example translated data database 220, the example event matcher 225, the example matrix generator 230, the example tree builder 235, the example candidate identifier 240, the example candidates database 245, the example panelist matcher 250, the example array builder 255, the example thresholder 260 and/or, more generally, the example matching engine 130 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example mappings database 132, the example data interface 205, the example raw data database 210, the example data normalizer 215, the example translated data database 220, the example event matcher 225, the example matrix generator 230, the example tree builder 235, the example candidate identifier 240, the example candidates database 245, the example panelist matcher 250, the example array builder 255, the example thresholder 260 and/or, more generally, the example matching engine 130 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example matching engine 130 of FIG. 1 may include one or more elements, processes and/or devices in addition to, or instead of, those illustrated in FIG. 2, and/or may include more than one of any or all of the illustrated elements, processes and devices.

Figure 10:
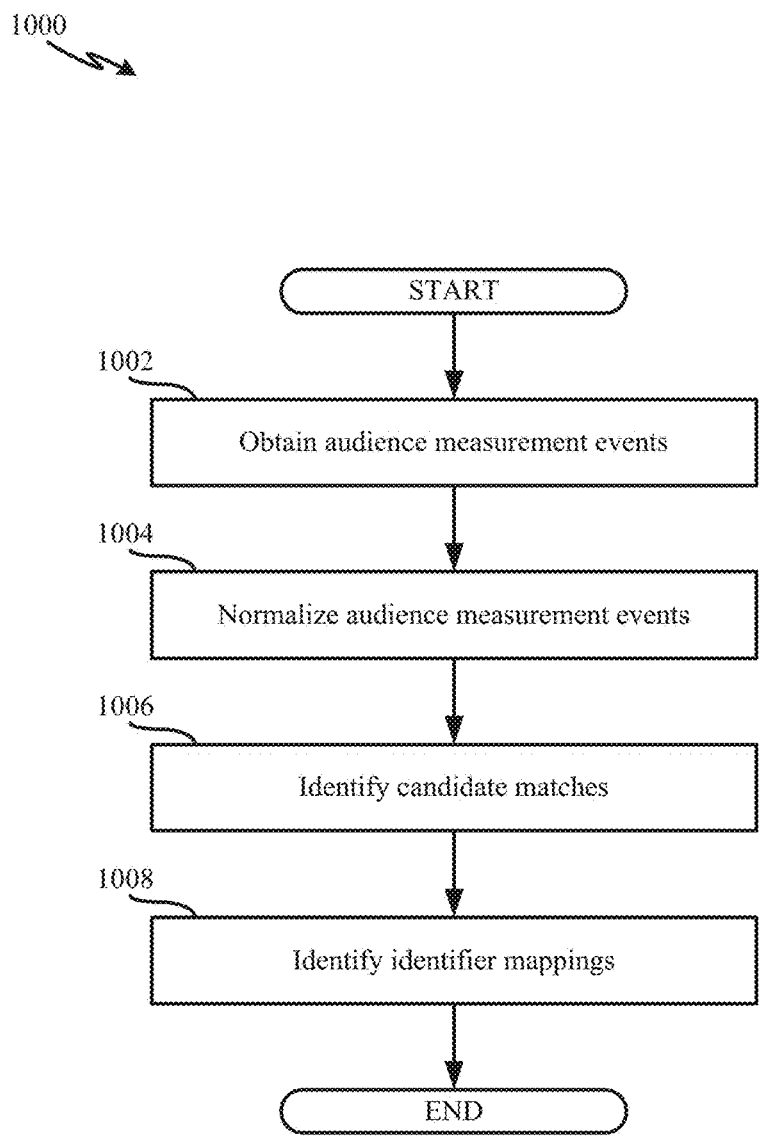
FIGS. 10, 11 and/or 12 are flowcharts representative of example computer readable instructions that may be executed by the processing platform of FIG. 13 to implement the example matching engine of FIG. 1 and/or FIG. 2.
Figure 11:
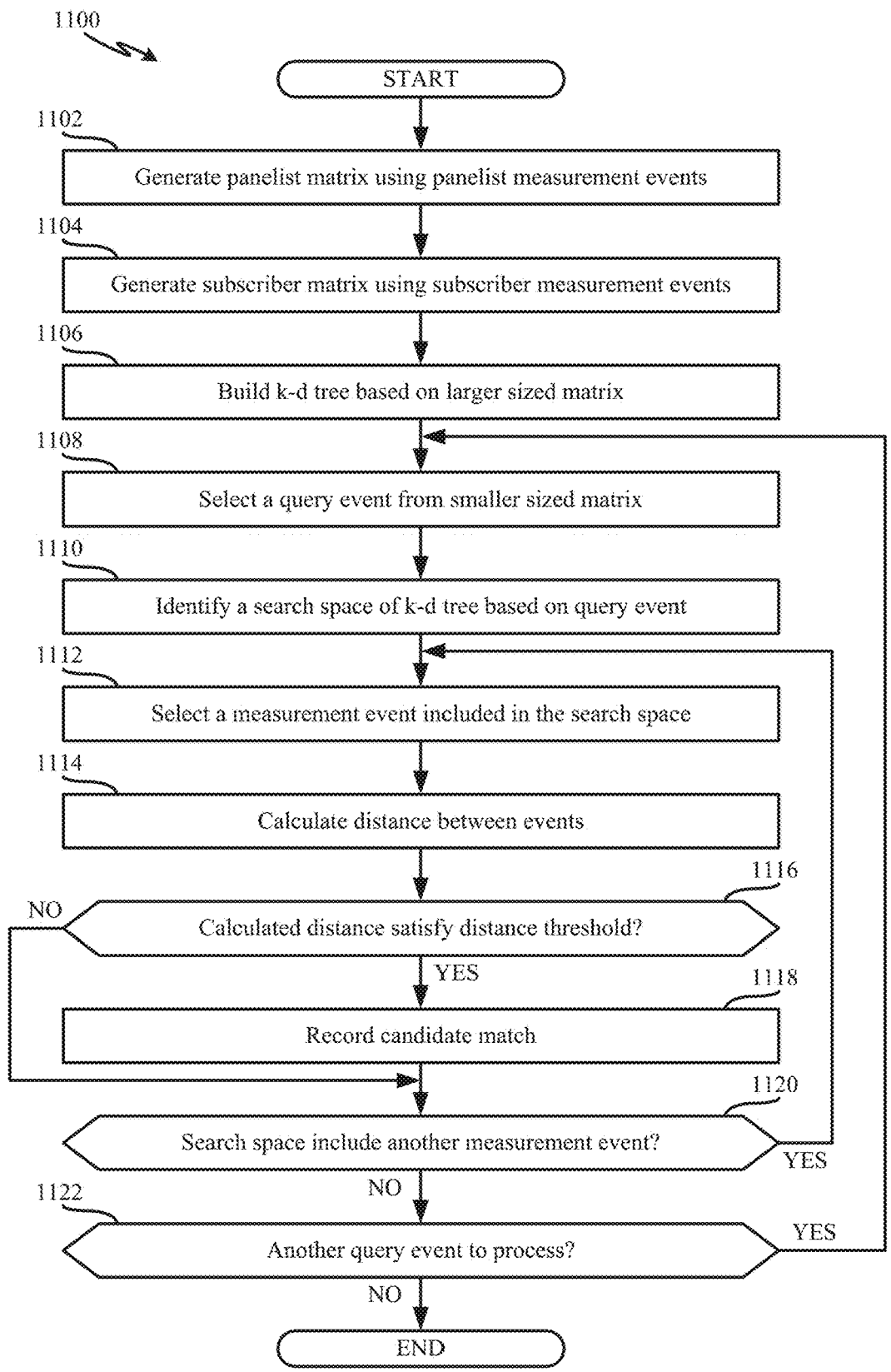

Flowcharts representative of example machine readable instructions for implementing the example matching engine 130 of FIGS. 1 and/or 2 are shown in FIGS. 10, 11 and/or 12. In this example, the machine readable instructions comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIGS. 10, 11 and/or 12, many other methods of implementing the example matching engine 130 may alternatively be used. For example, the order of execution of the blocks may be changed, and/or some of the blocks described may be changed, eliminated, or combined.

As mentioned above, the example processes of FIGS. 10, 11 and/or 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10, 11 and/or 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 10 is a flowchart representative of example computer readable instructions 1000 that may be executed by the example matching engine 130 of FIG. 1 and/or FIG. 2 to facilitate identity matching across audience measurement systems. The example program 1000 of FIG. 10 begins at block 1002 when the example matching engine 130 obtains audience measurement events. For example, the example data interface 205 (FIG. 2) may obtain panelist measurement events from the example TV measurement entity 108 (FIG. 1) and/or subscriber measurement events from the example subscription provider 116 (FIG. 1). The example data interface 205 records the obtained audience measurement events in the example raw data database 210 (FIG. 2).

At block 1004, the example matching engine 130 normalizes the audience measurement events. For example, the example data normalizer 215 (FIG. 2) transforms the audience measurement events from their raw form to be more meaningfully handed when performing identity matching. For example, the example data normalizer 215 may convert all start times to a minute format, may round all duration information to a common degree (e.g., to the tenth value), may convert station identifiers to a numerical value, etc. The example data normalizer 215 records the normalized audience measurement events in the example translated data database 220 (FIG. 2).

At block 1006, the example matching engine 130 identifies candidate matches in the normalized audience measurement events. For example, the example event matcher 225 (FIG. 2) processes the normalized panelist measurement events and the normalized audience measurement events to identify events that likely correspond to the same viewing session (e.g., candidate matches). The example event matcher 225 records the candidate matches in the example candidates database 245 (FIG. 2). An example implementation of block 1006 is described below in connection with FIG. 11.

At block 1008, the example matching engine 130 identifies identifier mappings that link a panelist to a subscriber. For example, the example panelist matcher 250 (FIG. 2) may process the many-to-many candidate matches included in the example candidates database 245 to identify a one-to-one mapping between a panelist identifier and a subscriber identifier. The example panelist matcher 250 records the identifier mappings in the example mappings database 132 (FIG. 1 and/or FIG. 2). An example implementation of block 1008 is described below in connection with FIG. 12. The example program 1000 of FIG. 10 then ends.

FIG. 11 is a flowchart representative of example computer readable instructions 1100 that may be executed by the example matching engine 130 of FIG. 1 and/or FIG. 2 to facilitate identifying candidate matches. The example program 1100 of FIG. 11 begins at block 1102 when the example event matcher 225 (FIG. 2) generates a panelist matrix using panelist measurement events. For example, the example matrix generator 230 (FIG. 2) may parse the normalized audience measurement events recorded in the example translated data database 220 (FIG. 2) and identify measurement events associated with panelists. In the illustrated example, the matrix generator 230 generates the panelist matrix ($M_{panelist}$) of size ($n_{events}$) by ($n_{variables}$)

based on the number of panelist measurement events ($n_{events}$) and the number of variables in common between the panelist measurement events and the subscriber measurement events (e.g., the linking variables) ($n_{variables}$).

At block 1104, the example event matcher 225 generates a subscriber matrix using subscriber measurement events. For example, the example matrix generator 230 may parse the normalized audience measurement events recorded in the example translated data database 220 and identify measurement events associated with subscribers. In the illustrated example, the matrix generator 230 generates the subscriber matrix ($M_{subscriber}$) of size ($n_{events}$) by ($n_{variables}$) based on the number of subscriber measurement events ($n_{events}$) and the number of variables in common between the panelist measurement events and the subscriber measurement events (e.g., the linking variables) ($n_{variables}$).

At block 1106, the example event matcher 225 builds a k-d tree. For example, the example tree builder 235 (FIG. 2) converts the larger-sized matrix (e.g., the matrix having more measurement events) into a k-d tree. In the illustrated example, the k-d tree includes a plurality of search spaces defined by the measurement events included in the larger-sized matrix. As an illustrative example, the tree builder 235 determines the subscriber matrix ($M_{subscriber}$) is the larger-sized matrix and the panelist matrix ($M_{panelist}$) is the smaller-sized matrix.

At block 1108, the example event matcher 225 selects a query event from the smaller-sized matrix to process. For example, the candidate identifier 240 (FIG. 2) selects a panelist measurement event from the panelist matrix ($M_{panelist}$). At block 1110, the example candidate identifier 240 identifies a search space of the k-d tree based on the selected query event. For example, the candidate identifier 240 identifies a search space associated with the start time, the duration and station identifier of the query event. At block 1112, the example candidate identifier 240 selects a measurement event (e.g., a subscriber measurement event) included in the search space.

At block 1114, the example candidate identifier 240 calculates a distance between the query event and the selected measurement event. For example, the candidate identifier 240 may use example Equation 1 to calculate the distance between the two events. At block 1116, the example candidate identifier 240 determines whether the calculated distance satisfies a distance threshold. If, at block 1116, the example candidate identifier 240 determines that the calculated distance does not satisfy the distance threshold (e.g., the calculated distance is greater than the distance threshold), control proceeds to block 1110 to determines whether there is another measurement event included in the search space to process.

If, at block 1116, the example candidate identifier 240 determines that the calculated distance satisfies the distance threshold (e.g., the calculated distance is less than or equal to the distance threshold), then, at block 1118, the example candidate identifier 240 records the candidate match in the example candidates database 245 (FIG. 2). For example, the example candidate identifier 240 may record the subscriber event identifier, the panelist event identifier, the calculated distance and the start time difference in the example candidates database 245. An example implementation of the candidate matches recorded in the example candidates database 245 is described in connection with FIG. 5.

At block 1120, the example candidate identifier 240 determines whether there is another measurement event included in the search space to process. If, at block 1120, the candidate identifier 240 determines that there is another measurement event included in the search space to process, control returns to block 1112 to select another measurement event included in the search space.

If, at block 1120, the example candidate identifier 240 determines that there is not another measurement event in the search space to process, then, at block 1122, the example candidate identifier 240 determines whether there is another query event to process. For example, the candidate identifier 240 may parse the panelist matrix ($M_{panelist}$) to determine whether there is an unprocessed panelist measurement event. If, at block 1122, the example candidate identifier 240 determines that there is another query event to process, then control returns to block 1108 to select another query event to process. If, at block 1122, the example candidate identifier 240 determines that there is not another query event to process (e.g., all panelist measurement events have been processed), the example program 1100 of FIG. 11 ends.

Figure 12:
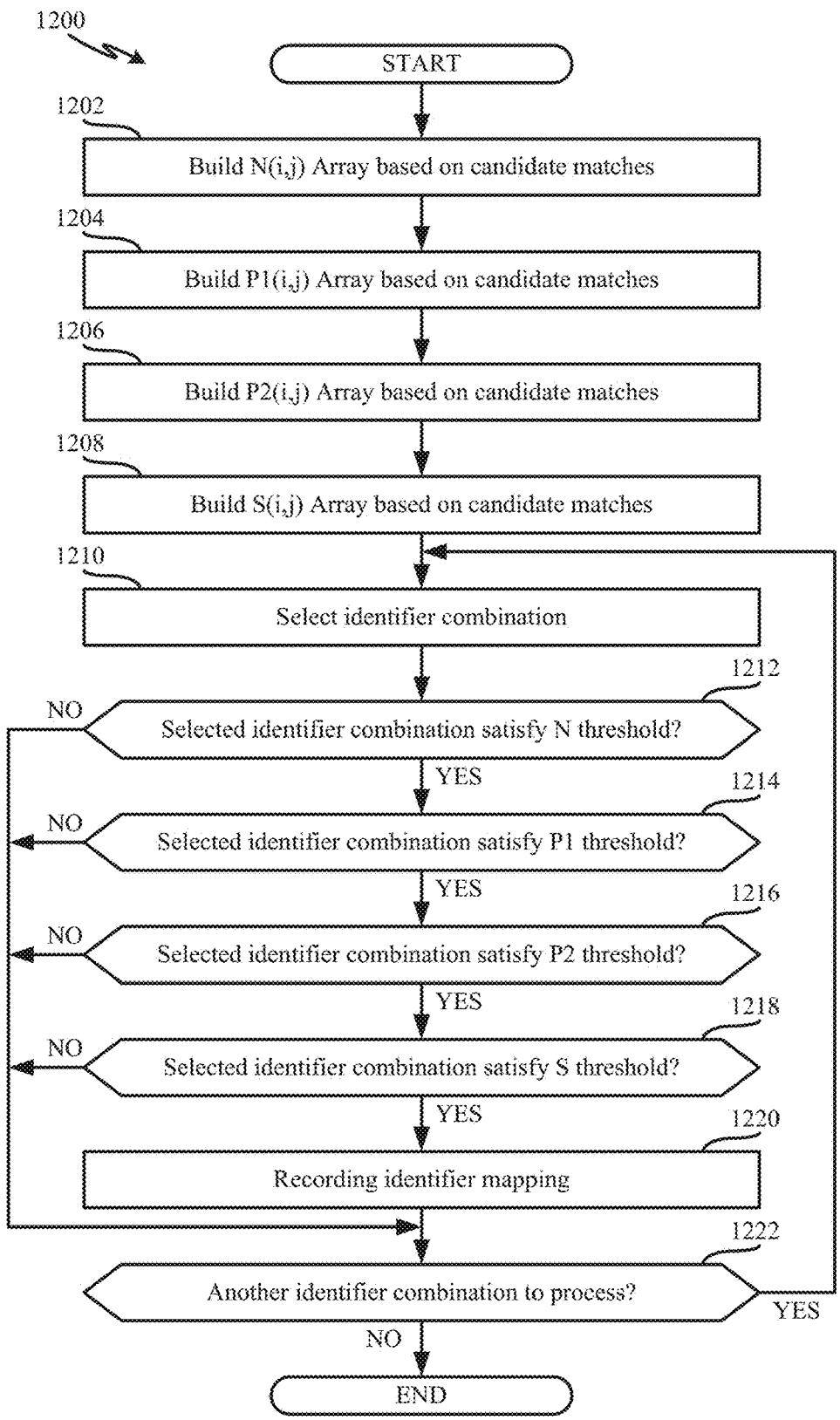

FIG. 12 is a flowchart representative of example computer readable instructions 1200 that may be executed by the example matching engine 130 of FIG. 1 and/or FIG. 2 to facilitate identifying identifier mappings. The example program 1200 of FIG. 12 begins at block 1202 when the example panelist matcher 250 (FIG. 2) builds the example ($N_{i,j}$) array based on candidate matches. For example, the example array builder 255 (FIG. 2) builds the example ($N_{i,j}$) array by identifying the number of matched events between an $i^{th}$ panelist identifier and a $j^{th}$ subscriber identifier identified in the example candidates database 245 (FIG. 2). An example implementation of the ($N_{i,j}$) array is disclosed in connection with the example ($N_{i,j}$) array 600 of FIG. 6.

At block 1204, the example array builder 255 builds the example ($P_{1(i,j)}$) array based on candidate matches. For example, the example array builder 255 builds the example ($P_{1(i,j)}$) array by calculating a first percentage of events associated with the $i^{th}$ panelist identifier that are determined matches to events from the $j^{th}$ subscriber identifier identified in the example candidates database 245. An example implementation of the ($P_{1(i,j)}$) array is disclosed in connection with the example ($P_{1(i,j)}$) array 700 of FIG. 7.

At block 1206, the example array builder 255 builds the example ($P_{2(i,j)}$) array based on candidate matches. For example, the example array builder 255 builds the example ($P_{2(i,j)}$) array by calculating a second percentage of events associated with the $j^{th}$ subscriber identifier that are determined matches to events from the $i^{th}$ panelist identifier identified in the example candidates database 245. An example implementation of the ($P_{2(i,j)}$) array is disclosed in connection with the example ($P_{2(i,j)}$) array 800 of FIG. 8.

At block 1208, the example array builder 255 builds the example ($S_{i,j}$) array based on candidate matches. For example, the example array builder 255 builds the example ($S_{i,j}$) array by calculating a variance (e.g., a standard deviation) in clock offsets between the $i^{th}$ panelist identifier and the $j^{th}$ subscriber identifier. An example implementation of the ($S_{i,j}$) array is disclosed in connection with the example ($S_{i,j}$) array 900 of FIG. 9.

At block 1210, the example panelist matcher 250 selects an identifier combination to process. For example, the panelist matcher 250 may select an identifier combination (panelist$_i$, subscriber$_j$) corresponding to a populated (e.g. non-zero) cell in the example ($N_{i,j}$) array.

At block 1212, the example panelist matcher 250 determines whether the selected identifier combination (panelist$_i$, subscriber$_j$) satisfies the number of matches threshold ($n_T$). For example, the example thresholder 260 (FIG. 2) may identity the number of matches associated with the selected identifier combination (panelist$_i$, subscriber$_j$) from the example ($N_{i,j}$) array and compare it to the number of matches threshold ($n_T$). If, at block 1212, the example thresholder 260 determines that the selected identifier combination (panelist$_i$, subscriber$_j$) does not satisfy the number of matches threshold ($n_T$) (e.g., the number of matches is less than the matches threshold ($n_T$)), then control proceeds to block 1222 to determine whether there is another identifier combination (panelist$_i$, subscriber$_j$) to process.

If, block 1212, the example thresholder 260 determines that the selected identifier combination (panelist$_i$, subscriber$_j$) satisfies the number of matches threshold ($n_T$) (e.g., the number of matches is greater than or equal to the matches threshold ($n_T$)), then, at block 1214, the example thresholder 260 determines whether the selected identifier combination (panelist$_i$, subscriber$_j$) satisfies the percentage of panelist matched events threshold ($P1_T$). For example, the example thresholder 260 may identity the percentage of panelist matched events associated with the selected identifier combination (panelist$_i$, subscriber$_j$) from the example ($P1_{(i,j)}$) array and compare it to the percentage of panelist matched events threshold ($P1_T$). If, at block 1214, the example thresholder 260 determines that the selected identifier combination (panelist$_i$, subscriber$_j$) does not satisfy the percentage of panelist matched events threshold ($P1_T$) (e.g., the percentage of panelist matched events is less than the threshold ($P1_T$)), then control proceeds to block 1222 to determine whether there is another identifier combination (panelist$_i$, subscriber$_j$) to process.

If, block 1214, the example thresholder 260 determines that the selected identifier combination (panelist$_i$, subscriber$_j$) satisfies the percentage of panelist matched events threshold ($P1_T$) (e.g., the percentage of panelist matched events is greater than or equal to the threshold ($P1_T$)), then, at block 1216, the example thresholder 260 determines whether the selected identifier combination (panelist$_i$, subscriber$_j$) satisfies the percentage of subscriber matched events threshold ($P2_T$). For example, the example thresholder 260 may identity the percentage of subscriber matched events associated with the selected identifier combination (panelist$_i$, subscriber$_j$) from the example ($P2_{(i,j)}$) array and compare it to the percentage of subscriber matched events threshold ($P2_T$). If, at block 1216, the example thresholder 260 determines that the selected identifier combination (panelist$_i$, subscriber$_j$) does not satisfy the percentage of subscriber matched events threshold ($P2_T$) (e.g., the percentage of subscriber matched events is less than the threshold ($P2_T$)), then control proceeds to block 1222 to determine whether there is another identifier combination (panelist$_i$, subscriber$_j$) to process.

If, block 1216, the example thresholder 260 determines that the selected identifier combination (panelist$_i$, subscriber$_j$) does not satisfy the percentage of subscriber matched events threshold ($P2_T$) (e.g., the percentage of subscriber matched events is greater than or equal to the threshold ($P2_T$)), then, at block 1218, the example thresholder 260 determines whether the selected identifier combination (panelist$_i$, subscriber$_j$) satisfies the variance in clock offset threshold ($S_T$). For example, the example thresholder 260 may identity the variance in clock offset associated with the selected identifier combination (panelist$_i$, subscriber$_j$) from the example ($S_{i,j}$) array and compare it to the variance in clock offset threshold ($S_T$). If, at block 1218, the example thresholder 260 determines that the selected identifier combination (panelist$_i$, subscriber$_j$) does not satisfy the variance in clock offset threshold ($S_T$) (e.g., the variance in clock offset is greater than the threshold ($S_T$)), then control proceeds to block 1222 to determine whether there is another identifier combination (panelist$_i$, subscriber$_j$) to process.

If, block 1218, the example thresholder 260 determines that the selected identifier combination (panelist$_i$, subscriber$_j$) satisfies the variance in clock offset threshold ($S_T$) (e.g., the variance in clock offset is less than or equal to the threshold ($S_T$)), then, at block 1220, the example thresholder 260 records the identifier mapping. For example, the example thresholder 260 may record the mapping including the panelist identifier and the subscriber identifier included in the selected identifier combination (panelist$_i$, subscriber$_j$) in the example mappings database 132 (FIG. 1 and/or FIG. 2).

At block 1222, the example panelist matcher 250 determines whether there is another identifier combination to process. For example, the panelist matcher 250 may parse the example ($N_{i,j}$) array to determine whether the example ($N_{i,j}$) array includes an unprocessed cell that is populated (e.g. a non-zero cell). If, at block 1222, the example panelist matcher 250 determines that there is an unprocessed cell, then control returns to block 1210 to select another identifier combination (panelist$_i$, subscriber$_j$) corresponding to a populated (e.g. non-zero) cell in the example ($N_{i,j}$) array. If, at block 1222, the example panelist matcher 250 determines that there is not an unprocessed cell, the example program 1200 of FIG. 12 ends.

Figure 13:
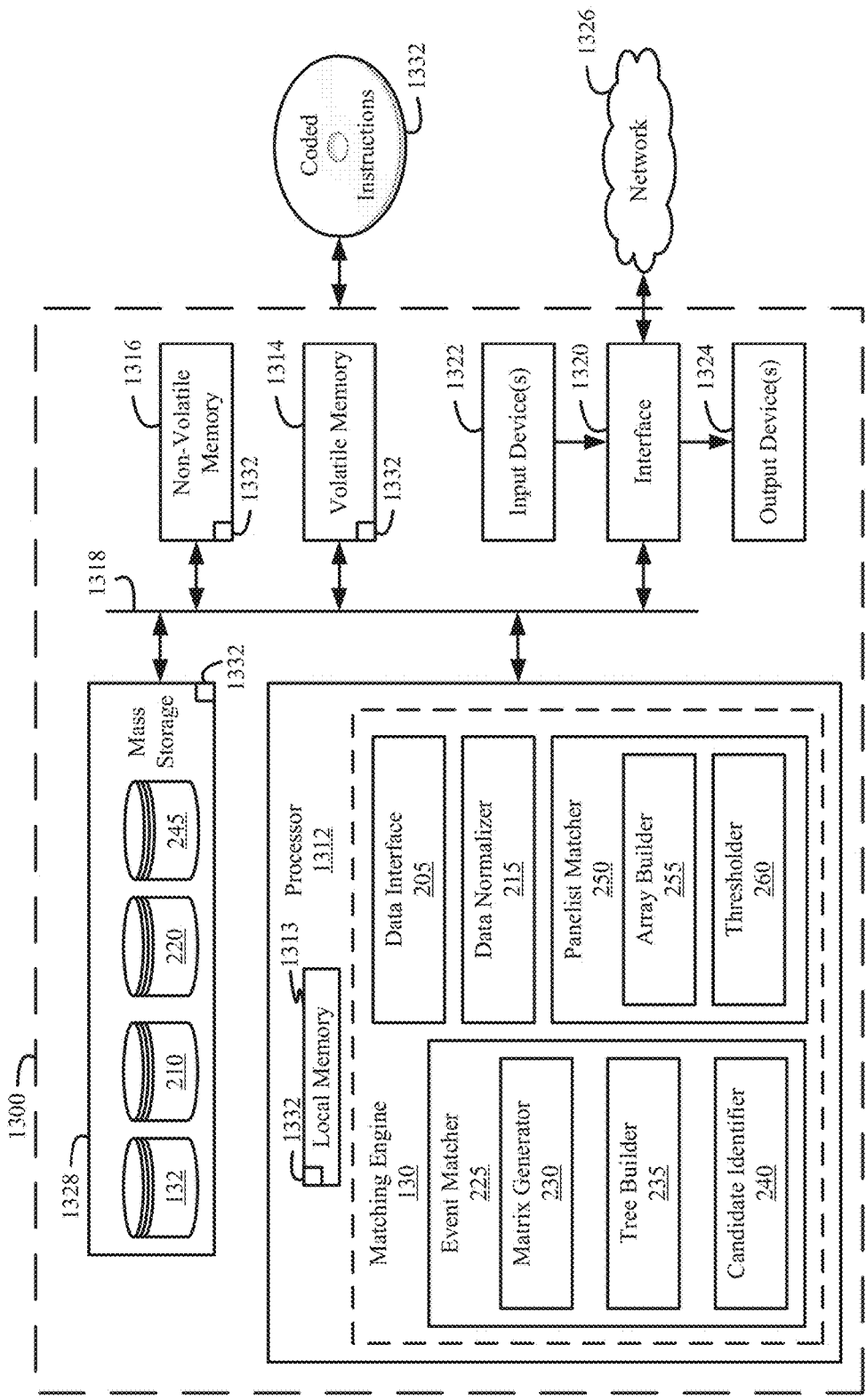
FIG. 13 is a block diagram of an example processing platform structured to execute the example machine-readable instructions of FIGS. 10, 11 and/or 12 to implement the example matching engine of FIG. 1 and/or FIG. 2.

FIG. 13 is a block diagram of an example processor platform 1300 capable of executing the instructions of FIGS. 10, 11 and/or 12 to implement the example matching engine 130 of FIGS. 1 and/or 2. The processor platform 1300 can be, for example, a server, a personal computer, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example executes the instructions to implement the example the example data interface 205, the example data normalizer 215, the example event matcher 225, the example matrix generator 230, the example tree builder 235, the example candidate identifier 240, the example panelist matcher 250, the example array builder 255 and/or the example thresholder 260.

The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. The example mass storage 1328 implements the example mappings database 132, the example raw data database 210, the example translated data database 220 and/or the example candidates database 245.

Coded instructions 1332 represented by the flowcharts of FIGS. 10, 11 and/or 12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods, apparatus and articles of manufacture facilitate performing identity matching across audience measurement systems. Disclosed examples obtain audience measurement events from different audience measurement systems and normalize the audience measurement events so that the events may be more meaningfully handled when performing identity matching. Disclosed examples utilize k-d trees and range searching to identify candidate matches that likely relate to a same viewing session. Disclosed examples then use the candidate matches to generate sparse arrays. Disclosed examples then apply thresholds to the sparse arrays to determine identifier mappings that link a panelist identifier to a subscriber identifier. In some examples, the above-disclosed methods, apparatus and articles of manufacture may use the identifier mappings to link (e.g., merge, fuse, etc.) user information from a first audience measurement system (e.g., a television measurement entity) to user information from a second audience measurement system (e.g., a subscription provider).

It is noted that this patent claims priority from U.S. Patent Provisional Application Ser. No. 62/387,535, which was filed on Dec. 22, 2015, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform identity matching, the apparatus comprising:
   a data normalizer to normalize audience measurement events corresponding to media exposure data obtained from a first audience measurement system and a second audience measurement system;
   a tree builder to build a k-dimensional tree based on normalized audience measurement events corresponding to the first audience measurement system, the k-dimensional tree including a plurality of search spaces;
   a candidate identifier to:
      identify a search space in the k-dimensional tree based on a query event corresponding to the second audience measurement system;
      calculate a distance between the query event and a first audience measurement event included in the search space, the first audience measurement event corresponding to the first audience measurement system; and
      identify the query event and the first audience measurement event as a candidate match when the calculated distance satisfies a distance threshold;
   an array builder to generate metrics at an identifier-level based on a plurality of candidate matches; and
   a thresholder to identify an identifier mapping linking a first user identifier associated with the first audience measurement system to a second user identifier associated with the second audience measurement system when the metrics satisfy respective metric thresholds, wherein at least one of the data normalizer, the tree builder, the candidate identifier, the array builder or the thresholder is implemented by at least one of hardware or at least one processor.

2. The apparatus as defined in claim 1, further including a matrix generator to:
   generate a first matrix based on normalized audience measurement events corresponding to the first audience measurement system; and
   generate a second matrix based on normalized audience measurement events corresponding to the second audience measurement system.

3. The apparatus as defined in claim 2, wherein a size associated with the first matrix corresponds to (1) a number of normalized audience measurement events corresponding to the first audience measurement system and (2) a number of variables in common between the normalized audience measurement events corresponding to the first audience measurement system and the normalized audience measurement events corresponding to the second audience measurement system.

4. The apparatus as defined in claim 3, wherein the tree builder is to:
   compare the size associated with the first matrix to a size associated with the second matrix; and
   determine the size associated with the first matrix is greater than the size associated with the second matrix when building the k-dimensional tree based on the normalized measurement events corresponding to the first audience measurement system.

5. The apparatus as defined in claim 1, wherein the array builder is to:

build a first array based on a number of matched events between a first set of user identifiers associated with the first audience measurement system and a second set of user identifiers associated with the second audience measurement system, the first set of user identifiers and the second set of user identifiers included in the plurality of candidate matches;

build a second array based on a first percentage of matched events associated with the first set of user identifiers;

build a third array based on a second percentage of matched events associated with the second set of user identifiers; and build a fourth array based on clock offsets associated with the plurality of candidate matches.

6. The apparatus as defined in claim 5, wherein the thresholder is to:

compare a first value associated with an identifier combination from the first array to a first threshold, the identifier combination (1) selected from the first set of user identifiers and the second set of user identifiers and (2) associated with a non-zero cell in the first array;

compare a first value associated with the identifier combination from the first array to a first threshold;

compare a second value associated with the identifier combination from the second array to a second threshold when the first value satisfies the first threshold;

compare a third value associated with the identifier combination from the third array to a third threshold when the second value satisfies the second threshold; and compare a fourth value associated with the identifier combination from the fourth array to a fourth threshold when the third value satisfies the third threshold.

7. The apparatus as defined in claim 6, wherein the thresholder is to record the identifier combination as the identifier mapping when the fourth value satisfies the fourth threshold.

8. A method to perform identity matching, the method comprising:

normalizing, by executing an instruction with a processor, audience measurement events corresponding to media exposure data obtained from a first audience measurement system and a second audience measurement system;

building, by executing an instruction with the processor, a k-dimensional tree based on normalized audience measurement events corresponding to the first audience measurement system, the k-dimensional tree including a plurality of search spaces;

identifying, by executing an instruction with the processor, a search space in the k-dimensional tree based on a query event corresponding to the second audience measurement system;

calculating, by executing an instruction with the processor, a distance between the query event and a first audience measurement event included in the search space, the first audience measurement event corresponding to the first audience measurement system;

identifying, by executing an instruction with the processor, the query event and the first audience measurement event as a candidate match when the calculated distance satisfies a distance threshold;

generating, by executing an instruction with the processor, metrics at an identifier-level based on a plurality of candidate matches; and identifying, by executing an instruction with the processor, an identifier mapping linking a first user identifier associated with the first audience measurement system to a second user identifier associated with the second audience measurement system when the metrics satisfy respective metric thresholds.

9. The method as defined in claim 8, further including:

generating a first matrix based on normalized audience measurement events corresponding to the first audience measurement system; and generating a second matrix based on normalized audience measurement events corresponding to the second audience measurement system.

10. The method as defined in claim 9, wherein a size associated with the first matrix corresponds to (1) a number of normalized audience measurement events corresponding to the first audience measurement system and (2) a number of variables in common between the normalized audience measurement events corresponding to the first audience measurement system and the normalized audience measurement events corresponding to the second audience measurement system.

11. The method as defined in claim 10, wherein the building of the k-dimensional tree based on the normalized measurement events corresponding to the first audience measurement system includes:

comparing the size associated with the first matrix to a size associated with the second matrix; and determining the size associated with the first matrix is greater than the size associated with the second matrix.

12. The method as defined in claim 8, further including:

building a first array based on a number of matched events between a first set of user identifiers associated with the first audience measurement system and a second set of user identifiers associated with the second audience measurement system, the first set of user identifiers and the second set of user identifiers included in the plurality of candidate matches;

building a second array based on a first percentage of matched events associated with the first set of user identifiers;

building a third array based on a second percentage of matched events associated with the second set of user identifiers; and building a fourth array based on clock offsets associated with the plurality of candidate matches.

13. The method as defined in claim 12, further including:

comparing a first value associated with an identifier combination from the first array to a first threshold, the identifier combination (1) selected from the first set of user identifiers and the second set of user identifiers and (2) associated with a non-zero cell in the first array;

in response to determining that the first value satisfies the first threshold, comparing a second value associated with the identifier combination from the second array to a second threshold;

in response to determining that the second value satisfies the second threshold, comparing a third value associated with the identifier combination from the third array to a third threshold; and in response to determining that that the third value satisfies the third threshold, comparing a fourth value associated with the identifier combination from the fourth array to a fourth threshold.

14. The method as defined in claim 13, further including recording the identifier combination as the identifier mapping in response to determining that the fourth value satisfies the fourth threshold.

15. A tangible computer readable storage medium comprising instructions that, when executed, cause a machine to at least:
- normalize audience measurement events corresponding to media exposure data obtained from a first audience measurement system and a second audience measurement system;
- build k-dimensional tree based on normalized audience measurement events corresponding to the first audience measurement system, the k-dimensional tree including a plurality of search spaces;
- identify a search space in the k-dimensional tree based on a query event corresponding to the second audience measurement system;
- calculate a distance between the query event and a first audience measurement event included in the search space, the first audience measurement event corresponding to the first audience measurement system;
- identify the query event and the first audience measurement event as a candidate match when the calculated distance satisfies a distance threshold;
- generate metrics at an identifier-level based on a plurality of candidate matches; and
- identify an identifier mapping linking a first user identifier associated with the first audience measurement system to a second user identifier associated with the second audience measurement system when the metrics satisfy respective metric thresholds.

16. The tangible computer readable storage medium as defined in claim 15, further including instructions that, when executed, cause the machine to:
- generate a first matrix based on normalized audience measurement events corresponding to the first audience measurement system; and
- generate a second matrix based on normalized audience measurement events corresponding to the second audience measurement system.

17. The tangible computer readable storage medium as defined in claim 16, wherein a size associated with the first matrix corresponds to (1) a number of normalized audience measurement events corresponding to the first audience measurement system and (2) a number of variables in common between the normalized audience measurement events corresponding to the first audience measurement system and the normalized audience measurement events corresponding to the second audience measurement system.

18. The tangible computer readable storage medium as defined in claim 17, further including instructions that, when executed, cause the machine to:
- compare the size associated with the first matrix to a size associated with the second matrix; and
- determine the size associated with the first matrix is greater than the size associated with the second matrix when building the k-dimensional tree based on the normalized measurement events corresponding to the first audience measurement system.

19. The tangible computer readable storage medium as defined in claim 15, further including instructions that, when executed, cause the machine to:
- build a first array based on a number of matched events between a first set of user identifiers associated with the first audience measurement system and a second set of user identifiers associated with the second audience measurement system, the first set of user identifiers and the second set of user identifiers included in the plurality of candidate matches;
- build a second array based on a first percentage of matched events associated with the first set of user identifiers;
- build a third array based on a second percentage of matched events associated with the second set of user identifiers; and
- build a fourth array based on clock offsets associated with the plurality of candidate matches.

20. The tangible computer readable storage medium as defined in claim 19, further including instructions that, when executed, cause the machine to:
- compare a first value associated with an identifier combination from the first array to a first threshold, the identifier combination (1) selected from the first set of user identifiers and the second set of user identifiers and (2) associated with a non-zero cell in the first array;
- compare a first value associated with the identifier combination from the first array to a first threshold;
- compare a second value associated with the identifier combination from the second array to a second threshold when the first value satisfies the first threshold;
- compare a third value associated with the identifier combination from the third array to a third threshold when the second value satisfies the second threshold;
- compare a fourth value associated with the identifier combination from the fourth array to a fourth threshold when the third value satisfies the third threshold; and
- record the identifier combination as the identifier mapping when the fourth value satisfies the fourth threshold.

* * * * *

UNITED STATES PATENT AND TRADEMARK OFFICE
CERTIFICATE OF CORRECTION

PATENT NO. : 10,244,278 B2  
APPLICATION NO. : 15/385404  
DATED : March 26, 2019  
INVENTOR(S) : Jonathan Sullivan et al.

Page 1 of 1

It is certified that error appears in the above-identified patent and that said Letters Patent is hereby corrected as shown below:

In the Claims

Column 34, Line 60 (Claim 13): Replace "that that" with --that--

Signed and Sealed this  
Fifth Day of May, 2020

Andrei Iancu  
*Director of the United States Patent and Trademark Office*